United States Patent
Watanabe et al.

(10) Patent No.: US 11,901,535 B2
(45) Date of Patent: Feb. 13, 2024

(54) PARTITION MEMBER, ASSEMBLED BATTERY, AND HEAT TRANSFER CONTROL METHOD OF ASSEMBLED BATTERY

(71) Applicant: Mitsubishi Chemical Corporation, Chiyoda-ku (JP)

(72) Inventors: Yoko Watanabe, Chiyoda-ku (JP); Tomohiro Kawai, Chiyoda-ku (JP)

(73) Assignee: Mitsubishi Chemical Corporation, Chiyoda-ku (JP)

( * ) Notice: Subject to any disclaimer, the term of this patent is extended or adjusted under 35 U.S.C. 154(b) by 0 days.

(21) Appl. No.: 16/886,910

(22) Filed: May 29, 2020

(65) Prior Publication Data
US 2020/0295416 A1 Sep. 17, 2020

Related U.S. Application Data

(63) Continuation of application No. PCT/JP2018/044274, filed on Nov. 30, 2018.

(30) Foreign Application Priority Data

Nov. 30, 2017 (JP) ................................. 2017-231304
Jun. 27, 2018 (JP) ................................. 2018-122543

(51) Int. Cl.
*H01M 10/6557* (2014.01)
*H01M 10/658* (2014.01)
(Continued)

(52) U.S. Cl.
CPC ..... *H01M 10/6557* (2015.04); *H01M 10/625* (2015.04); *H01M 10/651* (2015.04);
(Continued)

(58) Field of Classification Search
CPC ............. H01M 10/625; H01M 10/651; H01M 10/6555; H01M 10/6557; H01M 10/6567; H01M 10/658; H01M 50/20; Y02E 60/10
See application file for complete search history.

(56) References Cited

U.S. PATENT DOCUMENTS

| 2011/0274951 | A1 | 11/2011 | Yasui et al. |
| 2012/0148895 | A1* | 6/2012 | Fujikawa ............ H01M 10/486 429/120 |

(Continued)

FOREIGN PATENT DOCUMENTS

| JP | 2010-097693 A | 4/2010 |
| JP | 2012-084347 A | 4/2012 |

(Continued)

OTHER PUBLICATIONS

International Preliminary Report on Patentability and Written Opinion dated Jun. 2, 2020 in PCT/JP2018/044274 (submitting English translation only), 4 pages.

(Continued)

*Primary Examiner* — Lingwen R Zeng
(74) *Attorney, Agent, or Firm* — Oblon, McClelland, Maier & Neustadt, L.L.P.

(57) ABSTRACT

A partition member which partitions between a pair of unit batteries or a partition member which partitions between a unit battery and a member other than the unit battery, the thermal resistances $\theta_{d1}$, $\theta_{d2}$, $\theta_{p1}$, and $\theta_{p2}$ of the partition member satisfy $(\theta_{p1}/\theta_{p2})/(\theta_{d1}/\theta_{d2}) \le 1.0 \times 10^{-4}$.

12 Claims, 23 Drawing Sheets

(51) Int. Cl.
  *H01M 10/6567*  (2014.01)
  *H01M 10/651*   (2014.01)
  *H01M 10/625*   (2014.01)
  *H01M 50/204*   (2021.01)
  *H01M 50/291*   (2021.01)
  *H01M 10/6555*  (2014.01)

(52) U.S. Cl.
  CPC ..... *H01M 10/658* (2015.04); *H01M 10/6567* (2015.04); *H01M 50/204* (2021.01); *H01M 50/291* (2021.01); *H01M 10/6555* (2015.04); *Y02E 60/10* (2013.01)

(56) References Cited

U.S. PATENT DOCUMENTS

2018/0076494 A1*  3/2018  Kuboki ................. H01L 23/427
2019/0006642 A1   1/2019  Sakaguchi et al.

FOREIGN PATENT DOCUMENTS

| JP | 2012-252958 A | 12/2012 |
| JP | 2013-242979 A | 12/2013 |
| JP | 2015-076187 A | 4/2015 |
| WO | WO 2010/098067 A1 | 9/2010 |
| WO | WO 2012/032697 A1 | 3/2012 |
| WO | WO 2017/159527 A1 | 9/2017 |

OTHER PUBLICATIONS

International Search Report dated Feb. 19, 2019 in PCT/JP2018/044274 filed on Nov. 30, 2018, 1 page \* cited by examiner

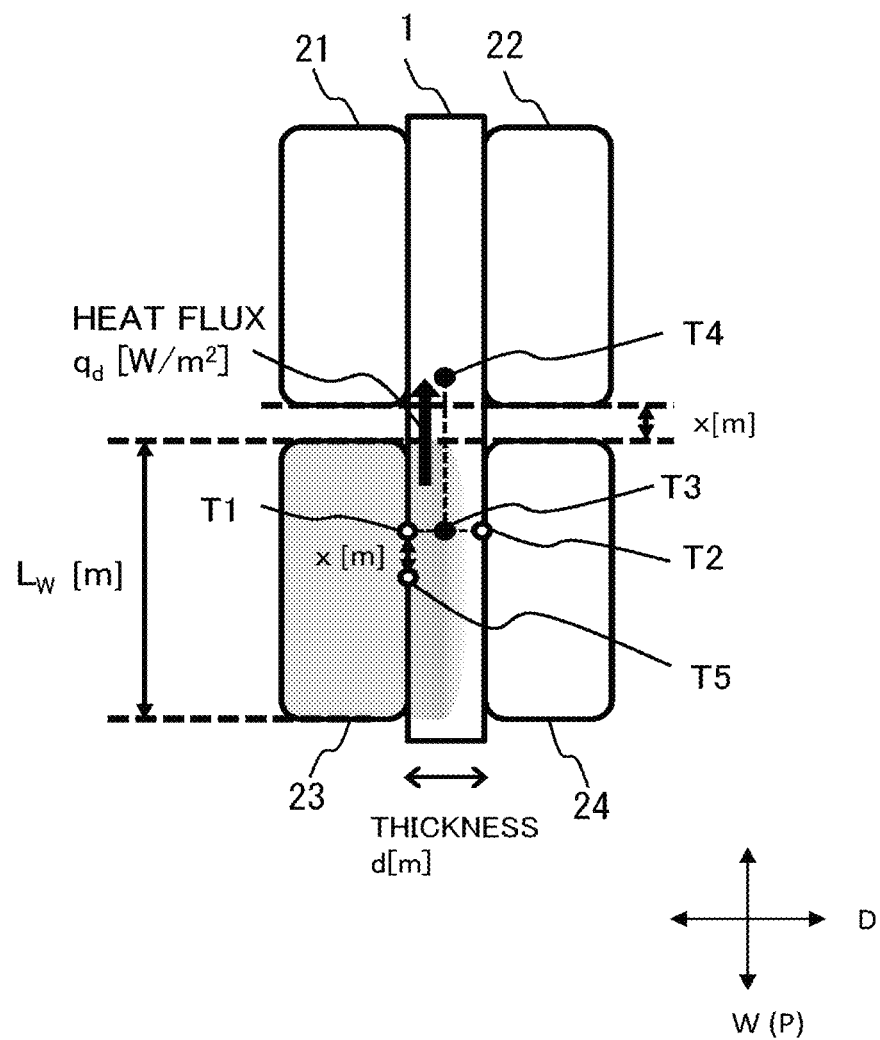

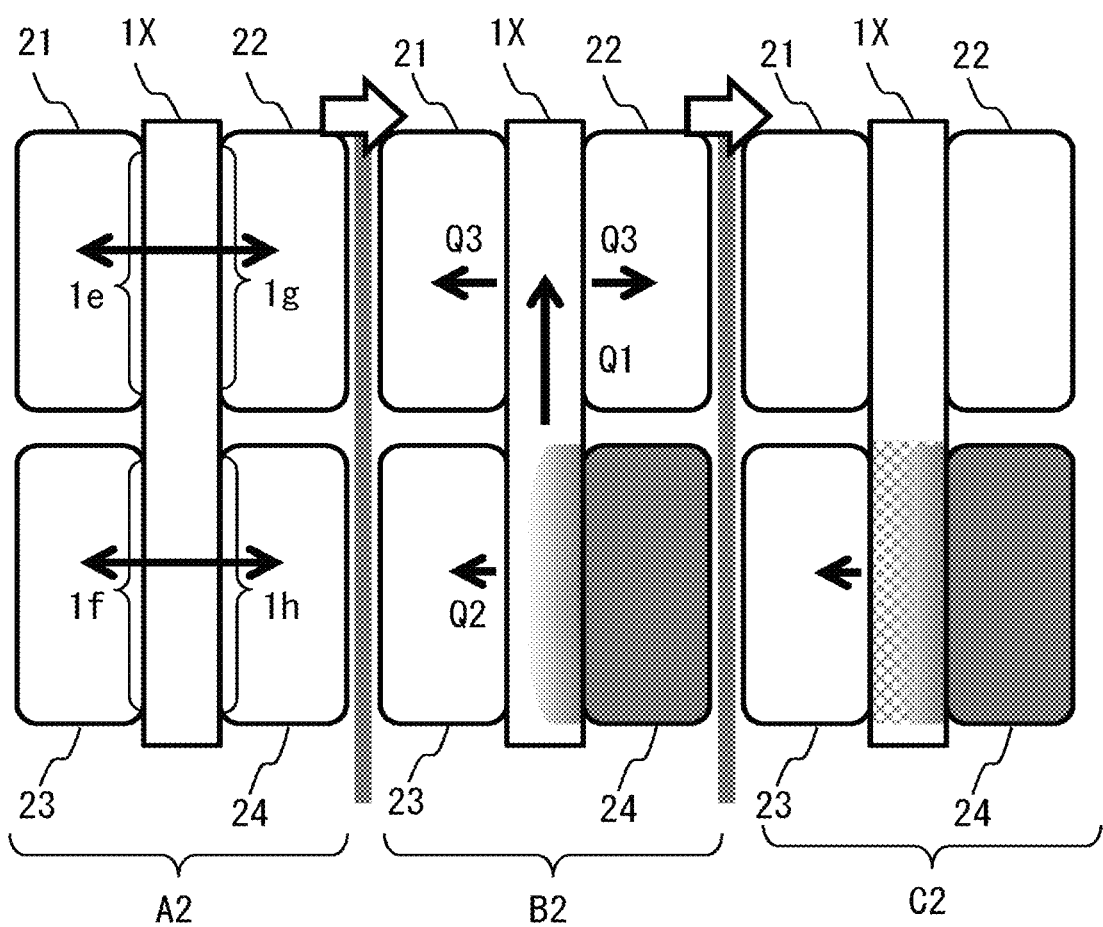

Point Graph: Tav_cell1 (K)   Point Graph: Tav_cell2 (K)
Point Graph: Tav_cell3 (K)   Point Graph: Tav_cell4 (K)

PARTITION MEMBER, ASSEMBLED BATTERY, AND HEAT TRANSFER CONTROL METHOD OF ASSEMBLED BATTERY

CROSS-REFERENCE TO RELATED APPLICATION

This application is a continuation application of International Application PCT/JP2018/044274 filed on Nov. 30, 2018 and designated the U.S., and this application is based upon and claims the benefit of priority of the prior Japanese Patent Application No. 2017-231304, filed on Nov. 30, 2017 and the prior Japanese Patent Application No. 2018-122543, filed on Jun. 27, 2018, the entire contents of which are incorporated herein by reference.

BACKGROUND

1. Field

The disclosure relates to a partition member, an assembled battery, and a heat transfer control method of an assembled battery.

2. Description of the Related Art

In recent years, with respect to secondary batteries which are being used as power supplies of vehicles and the like with rapidly increasing frequency, studies to increase energy density of the secondary batteries are being carried out for the purposes of increasing a degree of freedom when mounting a secondary battery in a limited space of a vehicle or the like and extending a cruising range that can be traveled by one charge.

Meanwhile, safety of a secondary battery tends to contradict energy density and there is a tendency that, the higher the energy density of a secondary battery, the lower a safety level thereof. For example, with a secondary battery mounted to an electric vehicle with a cruising range of several hundred km, battery surface temperature when the secondary battery is damaged due to overcharge, internal short-circuit, or the like exceeds several hundred degrees and may sometimes approach 1000° C.

Since a secondary battery used as a power supply of a vehicle or the like is generally used as an assembled battery made up of a plurality of unit batteries (hereinafter, also referred to as "cells"), when one of the unit batteries constituting the assembled battery is damaged and reaches the temperature range described above, there is a risk that the heat generation may damage adjacent unit batteries and the damage may spread in a chain reaction across the entire assembled battery. In order to prevent such a chain of damage among unit batteries, various techniques are being proposed, including providing a partition member between one unit battery and another to quickly move heat from a unit battery at which abnormal heat generation had occurred to a nearby unit battery and to cool a damaged unit battery.

For example, WO 2012/032697 investigates a method of cooling a battery having abnormally generated heat. Specifically, a battery module is disclosed in which a cooling unit housing a coolant is provided in a vicinity of a unit battery, the cooling unit includes a sealed portion formed by sealing a sheet-like portion, and a part of the sealed portion is provided with an unsealed portion which is unsealed when the unit battery abnormally generates heat.

In addition, WO 2010/098067 investigates a structure of a coolant storage portion and a coolant releasing mechanism for cooling a battery having abnormally generated heat. Specifically, a battery module is disclosed which includes: a battery unit constituted by a plurality of unit batteries; a housing which has a storage portion of which at least one end is an open end and which houses the battery unit in the storage portion; a lid body which has an opening and which covers the open end of the housing; and a heat absorbing member which has an endothermic material and an exterior film that includes the endothermic material and which is provided in contact with a side surface of the battery unit, wherein the external film has a stack structure made up of a resin layer and a metallic film which has a higher melting point than a softening temperature of the resin layer and which melts due to heat generation of the unit battery.

Furthermore, Japanese Patent Application Laid-open No. 2010-97693 discloses a method of suppressing heat transfer from a battery at which abnormal heat generation had occurred to an adjacent battery by constructing a partition member installed between batteries by a fusible base material and a thermosetting resin and suppressing thermal conduction due to the partition member by melting of the base material.

In addition, there is an assembled battery which houses a plurality of battery cells arranged side by side in a container, the assembled battery including: an endothermic chamber which is formed in a hollow manner inside a bulkhead separating the battery cells in the container; an exothermic chamber which is formed in a hollow manner inside a wall body that encloses an outer circumference of the battery cells; and a refrigerant encapsulated inside the endothermic chamber and the exothermic chamber (for example, refer to Japanese Patent Application Laid-open No. 2012-252958). Furthermore, there is a battery pack including: a plurality of battery cells stacked and installed in a thickness direction; a cooling plate member integrally supported with the battery cells; and a fluid pipe forming a passage through which a heating medium circulates, wherein the cooling plate member has a heat receiving portion which comes into contact with the battery cells and receives heat, and a heat radiating portion which is a portion capable of transferring heat to and from the heat receiving portion and of which a sectional area of a portion that comes into contact with the fluid pipe is set larger than a sectional area of the heat receiving portion (for example, refer to Japanese Patent Application Laid-open No. 2015-76187). Moreover, there is a power storage module in which a plurality of capacitors are arranged in a thickness direction thereof inside a housing, heat insulating boards are arranged on both sides of the plurality of capacitors in a capacitor arrangement direction, radiator plates are arranged on both sides of each of the plurality of capacitors in a capacitor arrangement direction, and a butting member of the housing provided in correspondence with each radiator plate is caused to butt against a member which opposes the butting member in the capacitor arrangement direction (for example, refer to Japanese Patent Application Laid-open No. 2013-242979).

SUMMARY

A thorough assessment of these conventional techniques carried out by the present inventors revealed that, based on a consideration of an amount of heat generation of unit batteries constituting an assembled battery and a quantitative consideration of an effect of heat transfer by members other than the batteries constituting the assembled battery, there is insufficient examination of a thermal resistance value which is necessary to prevent a chain of damages among the batteries.

In WO 2012/032697 described above, while there is a detailed examination of a method of cooling a battery at which abnormal heat generation had occurred, there is no quantitative examination of an amount of heat generation of a cell at which abnormal heat generation had occurred and cooling capacity of a coolant. In addition, in WO 2010/098067 described above, there is no quantitative examination of an amount of heat generation of a battery at which abnormal heat generation had occurred and cooling capacity of a coolant.

Furthermore, in Japanese Patent Application Laid-open No. 2010-97693 described above, there is no quantitative examination of a variation in a thermal resistance value of a partition member due to melting of a base material, and when thermal resistance of the partition member varies but a temperature range of the variation, thermal resistance values before and after the variation, and the like are not appropriately designed, although a part of an amount of heat transfer from a battery at which abnormal heat generation had occurred to an adjacent battery can be suppressed, it is conceivably difficult to prevent the adjacent battery from eventually reaching a state of abnormal heat generation.

An object of the disclosure is to provide a partition member, an assembled battery, and a heat transfer control method of an assembled battery which enable heat transfer between unit batteries constituting an assembled battery or between a unit battery constituting an assembled battery and a member other than the unit battery to be controlled.

The present inventors focused on a thermal resistance value necessary to prevent a chain of damage among batteries which has not been sufficiently examined in the conventional techniques described above and carried out a thorough examination of applicable conditions. As a result, the present inventors found that, in a partition member which has a thickness direction and a plane direction that is perpendicular to the thickness direction and which partitions unit batteries constituting an assembled battery in the thickness direction or partitions the unit batteries constituting the assembled battery and members other than the unit batteries, it is important to appropriately control a thermal resistance value in the thickness direction and the plane direction both when an abnormal temperature rise occurs in any of the unit batteries in contact with the partition member and when an abnormal temperature rise occurs in none of the unit batteries in contact with the partition member, and an embodiment of the present invention was made based on such findings. The present invention is as described below.

[1] A partition member which partitions between a pair of unit batteries or a partition member which partitions between a unit battery and a member other than the unit battery, wherein $\theta_{d1}$, $\theta_{d2}$, $\theta_{p1}$, and $\theta_{p2}$ defined as follows satisfy Expression (1) below:

$$(\theta_{p1}/\theta_{p2})/(\theta_{d1}/\theta_{d2}) \leq 1.0 \times 10^{-4} \quad \text{(Expression 1)}$$

$\theta_{d1}$: when a first point existing on a first surface of the partition member reaches 150° C., thermal resistance per unit area in a thickness direction defined by a difference in temperature between the first point and a second point at a plane-symmetrical position to the first point with respect to a division plane that bisects the partition member in the thickness direction on a second surface;

$\theta_{p1}$: when the first point existing on the first surface of the partition member reaches 150° C., thermal resistance per unit area in a plane direction defined by a difference between a temperature at a first intersection point where a straight line connecting the first point and the second point and the division plane intersect each other and a temperature at a point on the division plane at a position at a distance that is ½ of a length of the partition member in a long axis direction from the first point in the long axis direction;

$\theta_{d2}$: when the entire first surface is set to 40° C., thermal resistance per unit area in the thickness direction of the partition member which is defined by a difference in temperature between a third point at a same position as the first point and a fourth point at a same position as the second point; and $\theta_{p2}$: when the entire first surface is set to 40° C., thermal resistance per unit area in the plane direction of the partition member which is defined by a difference between a temperature at an intersection point where a straight line connecting the third point and the fourth point and the division plane intersect each other and a temperature at a point on the division plane at a position at a distance that is ½ of the length of the partition member in the long axis direction from the intersection point in the long axis direction.

[2] A partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries, the partition member having a long axis direction and a short axis direction respectively included in the plane direction and having a first surface and a second surface facing opposite directions in the thickness direction, the set of n-number of unit batteries being respectively in contact with the first surface and including a first unit battery and a third unit battery arranged apart from each other by a first distance, the set of m-number of unit batteries being in contact with the second surface and including a second unit battery which opposes the first unit battery across the partition member, wherein when an entire surface with which the first unit battery is in contact is set to 150° C., thermal resistance ($\theta_{d1}$) per unit area in the thickness direction of the partition member which is defined by a difference in temperature between a first point at the first distance in the long axis direction toward a side of the third unit battery from a center point of a surface on which the first unit battery comes into contact with the partition member and a second point at a plane-symmetrical position to the first point with respect to a division plane that bisects the partition member in the thickness direction on the second surface, thermal resistance ($\theta_{p1}$) per unit area in the plane direction of the partition member which is defined by a difference between a temperature at a first intersection point where a straight line connecting the first point and the second point and the division plane intersect each other and a temperature at a point at a second distance which is ½ of a length by which the partition member and the first unit battery are in contact with each other in the long axis direction and which is longer than the first distance in the plane direction of the partition member on the division plane from the first intersection point on the division plane, when the entire surface with which the first unit battery is in contact is set to 40° C., thermal resistance ($\theta_{d2}$) per unit area in the thickness direction of the partition member which is defined by a difference in temperature between a third point at a same position as the first point and a fourth point at a same position as the second point, and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane separated by the second distance in the plane direction of the partition member from the first intersection point on the division plane satisfy Expression 1 below.

$$(\theta_{p1}/\theta_{p2})/(\theta_{d1}/\theta_{d2}) \leq 1.0 \times 10^{-4} \quad \text{(Expression 1)}$$

[3] The partition member according to [1] or [2], wherein the thermal resistance ($\theta_{d1}$) and the thermal resistance ($\theta_{P1}$) satisfy Expression 2 below.

$$\theta_{d1}/\theta_{p1} \geq 1.0 \times 10^2 \quad \text{(Expression 2)}$$

[4] The partition member according to any of [1] to [3], wherein when a thickness of the unit battery in contact with the partition member is L [mm], the thickness of the partition member is L/50 mm or more and L/5 mm or less.

[5] An assembled battery including the partition member according to any of [1] to [4].

[6] The assembled battery according to [5], wherein a heat amount that is transferred from a unit battery in which an abnormal temperature rise had occurred to a unit battery opposing, in the thickness direction of the partition member, the unit battery in which an abnormal temperature rise had occurred is controlled by increasing the thermal resistance ($\theta_{d1}$) per unit area in the thickness direction of the partition member and reducing the thermal resistance ($\theta_{p1}$) per unit area in the plane direction.

[7] A heat transfer control method of an assembled battery, the assembled battery including a partition member which partitions between a pair of unit batteries or a partition member which partitions between a unit battery and a member other than the unit battery, the partition member having a thickness direction and a plane direction perpendicular to the thickness direction, having a long axis direction and a short axis direction respectively included in the plane direction, and having a first surface and a second surface facing opposite directions in the thickness direction, the heat transfer control method comprising controlling a heat amount transferred via the partition member from the first unit battery by having the following satisfy Expression 1 below:

when a first point on the first surface of the partition member reaches 150° C., thermal resistance ($\theta_{d1}$) per unit area in the thickness direction of the partition member which is defined by a difference in temperature between the first point and a second point at a plane-symmetrical position to the first point with respect to a division plane that bisects the partition member in the thickness direction on the second surface;

thermal resistance ($\theta_{p1}$) per unit area in the plane direction of the partition member which is defined by a difference between a temperature at a first intersection point where a straight line connecting the first point and the second point and the division plane intersect each other and a temperature at a point on the division plane at a position at a distance that is ½ of a length of the partition member in the long axis direction from the first intersection point in the long axis direction;

when the entire first surface is set to 40° C., thermal resistance ($\theta_{d2}$) per unit area in the thickness direction of the partition member which is defined by a difference in temperature between a third point at a same position as the first point and a fourth point at a same position as the second point; and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane at a position at a distance that is ½ of the length of the partition member in the long axis direction from the second intersection point in the long axis direction.

$$(\theta_{p1}/\theta_{p2})/(\theta_{d1}/\theta_{d2}) \leq 1.0 \times 10^{-4} \quad \text{(Expression 1)}$$

[8] A heat transfer control method of an assembled battery, the assembled battery including a partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries, the partition member having a long axis direction and a short axis direction respectively included in the plane direction and having a first surface and a second surface facing opposite directions in the thickness direction, the set of n-number of unit batteries being respectively in contact with the first surface and including a first unit battery and a third unit battery arranged apart from each other by a first distance, the set of m-number of unit batteries being in contact with the second surface and including a second unit battery which opposes the first unit battery across the partition member, the heat transfer control method comprising controlling a heat amount transferred via the partition member from the first unit battery by having the following satisfy Expression 1 below:

when an entire surface with which the first unit battery is in contact is set to 150° C., thermal resistance ($\theta_{d1}$) per unit area in the thickness direction of the partition member which is defined by a difference in temperature between a first point at the first distance in the long axis direction toward a side of the third unit battery from a center point of a surface on which the first unit battery comes into contact with the partition member and a second point at a plane-symmetrical position to the first point with respect to a division plane that bisects the partition member in the thickness direction on the second surface;

thermal resistance ($\theta_{p1}$) per unit area in the plane direction of the partition member which is defined by a difference between a temperature at a first intersection point where a straight line connecting the first point and the second point and the division plane intersect each other and a temperature at a point at a second distance which is ½ of a length by which the partition member and the first unit battery are in contact with each other in the long axis direction and which is longer than the first distance in the plane direction of the partition member on the division plane from the first intersection point on the division plane;

when the entire surface with which the first unit battery is in contact is set to 40° C., thermal resistance ($\theta_{d2}$) per unit area in the thickness direction of the partition member which is defined by a difference in temperature between a third point at a same position as the first point and a fourth point at a same position as the second point; and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane separated by the second distance in the plane direction of the partition member from the first intersection point on the division plane.

$$(\theta_{p1}/\theta_{p2})/(\theta_{d1}/\theta_{d2}) \leq 1.0 \times 10^{-4} \qquad \text{(Expression 1)}$$

According to embodiments of the partition member, the assembled battery, and the heat transfer control method of the assembled battery, heat transfer between unit batteries constituting an assembled battery or between a unit battery constituting an assembled battery and a member other than the unit battery can be controlled.

BRIEF DESCRIPTION OF THE DRAWINGS

FIG. 1C is a diagram for illustrating thermal resistance in a plane direction of a partition member;

FIG. 6 is a diagram schematically showing a second case in which one of a plurality of unit batteries arranged side by side on one of two surfaces in a thickness direction of a partition member reaches a high temperature;

DESCRIPTION OF THE PREFERRED EMBODIMENT

Figure 1A:
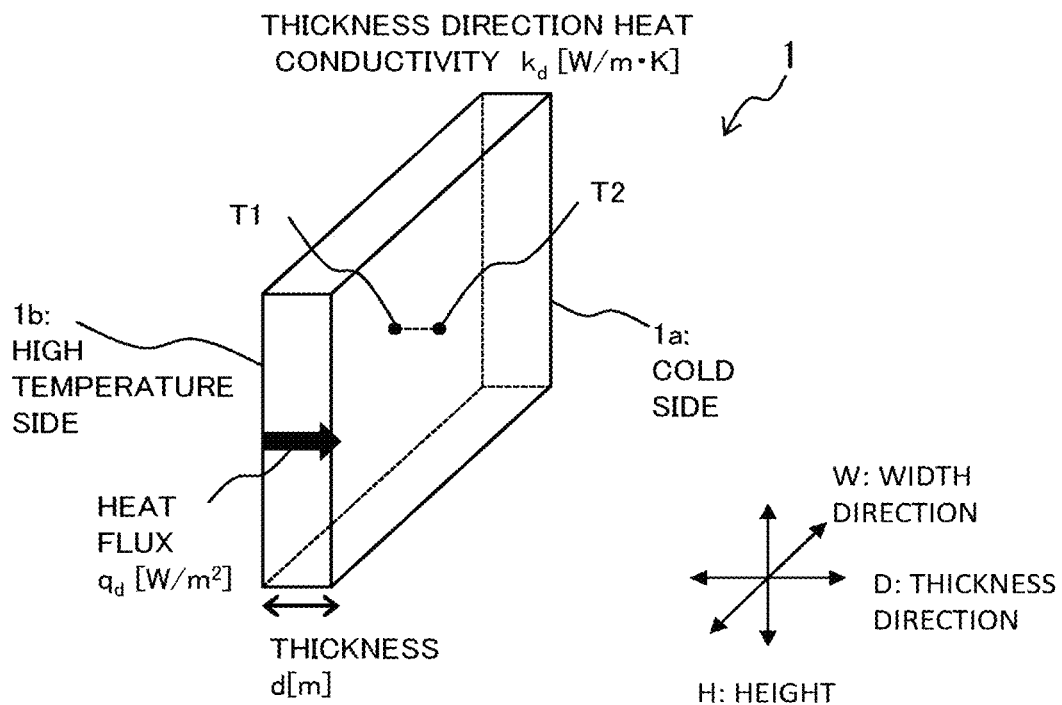
FIG. 1A is a diagram for illustrating thermal resistance in a thickness direction of a partition member.

Hereinafter, an embodiment of the present invention will be described in detail. It is to be understood that the following description represents an example of examples of an embodiment of the present invention and that an embodiment of the present invention is not limited to contents of the examples as long as there is no departure from the spirit of the invention.

A partition member which partitions between a pair of unit batteries or a partition member which partitions between a unit battery and a member other than the unit battery (in an embodiment of the present invention, also referred to as "a partition member according to a first aspect of an embodiment of the present invention") is a partition member which partitions between a pair of unit batteries or a partition member which partitions between a unit battery and a member other than the unit battery, wherein $\theta_{d1}$, $\theta_{d2}$, $\theta_{p1}$, and $\theta_{p2}$ defined as follows satisfy Expression (1) below.

$$(\theta_{p1}/\theta_{p2})/(\theta_{d1}/\theta_{d2}) \leq 1.0 \times 10^{-4} \quad \text{(Expression 1)}$$

$\theta_{d1}$: when a first point existing on a first surface of the partition member reaches 150° C., thermal resistance per unit area in a thickness direction defined by a difference in temperature between the first point and a second point at a plane-symmetrical position to the first point with respect to a division plane that bisects the partition member in the thickness direction on a second surface $\theta_{p1}$: when the first point existing on the first surface of the partition member reaches 150° C., thermal resistance per unit area in a plane direction defined by a difference between a temperature at a first intersection point where a straight line connecting the first point and the second point and the division plane intersect each other and a temperature at a point on the division plane at a position at a distance that is ½ of a length of the partition member in a long axis direction from the first point in the long axis direction $\theta_{d2}$: when the entire first surface is set to 40° C., thermal resistance per unit area in the thickness direction of the partition member which is defined by a difference in temperature between a third point at a same position as the first point and a fourth point at a same position as the second point $\theta_{p2}$: when the entire first surface is set to 40° C., thermal resistance per unit area in the plane direction of the partition member which is defined by a difference between a temperature at an intersection point where a straight line connecting the third point and the fourth point and the division plane intersect each other and a temperature at a point on the division plane at a position at a distance that is ½ of the length of the partition member in the long axis direction from the intersection point in the long axis direction In addition, a partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries (in an embodiment of the present invention, also referred to as "a partition member according to a second aspect of an embodiment of the present invention"), the partition member having a long axis direction and a short axis direction respectively included in the plane direction and having a first surface and a second surface facing opposite directions in the thickness direction, the set of n-number of unit batteries being respectively in contact with the first surface and including a first unit battery and a third unit battery arranged apart from each other by a first distance, the set of m-number of unit batteries being in contact with the second surface and including a second unit battery which opposes the first unit battery across the partition member, wherein when an entire surface with which the first unit battery is in contact is set to 150° C., thermal resistance ($\theta_{d1}$) per unit area in the thickness direction of the partition member which is defined by a difference in temperature between a first point at the first distance in the long axis direction toward a side of the third unit battery from a center point of a surface on which the first unit battery comes into contact with the partition member and a second point at a plane-symmetrical position to the first point with respect to a division plane that bisects the partition member in the thickness direction on the second surface, thermal resistance ($\theta_{p1}$) per unit area in the plane direction of the partition member which is defined by a difference between a temperature at a first intersection point where a straight line connecting the first point and the second point and the division plane intersect each other and a temperature at a point at a second distance which is ½ of a length by which the partition member and the first unit battery are in contact with each other in the long axis direction and which is longer than the first distance in the plane direction of the partition member on the division plane from the first intersection point on the division plane, when the entire surface with which the first unit battery is in contact is set to 40° C., thermal resistance ($\theta_{d2}$) per unit area in the thickness direction of the partition member which is defined by a difference in temperature between a third point at a same position as the first point and a fourth point at a same position as the second point, and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane separated by the second distance in the plane direction of the partition member from the first intersection point on the division plane satisfy Expression 1 below.

$$(\theta_{p1}/\theta_{p2})/(\theta_{d1}/\theta_{d2}) \leq 1.0 \times 10^{-4} \quad \text{(Expression 1)}$$

A temperature at which thermal runaway occurs in a part of or an entirety of a unit battery is, when performing a heating test where the unit battery in a high-temperature state is held at a constant atmospheric temperature, an upper limit temperature at which thermal runaway does not occur even when the unit battery is held for 10 hours. In the case of a conventional lithium ion battery, the temperature at which thermal runaway starts may be assumed to be 150° C. (or around 130° C. to 180° C.) for the sake of brevity. In addition, in a steady state, a temperature of a surface with which a unit battery comes into contact with a partition member can be set to 40° C.

With the partition member described above, by controlling thermal resistance per unit area of the partition member in the thickness direction and thermal resistance per unit area of the partition member in the plane direction, heat transfer in the thickness direction from a unit battery of which temperature has risen to or above the temperature at which thermal runaway starts is suppressed and heat transfer in the plane direction is promoted. Therefore, thermal runaway of unit batteries other than the unit battery of which temperature has risen to or above the temperature at which thermal runaway starts can be avoided.

It should be noted that whether a given partition member is a partition member according to the first aspect of an embodiment of the present invention or a partition member according to the second aspect of an embodiment of the present invention can be verified as follows.

<Verification Method of Partition Member According to First Aspect>

[1. Determination of Thermal Resistance ($\theta_{d1}$) and Thermal Resistance ($\theta_{p1}$)]

1-1) A given region on one surface of a partition member to be a verification object is heated to 150° C. A point in the heated region is considered a first point. It should be noted that this heating method is not limited to any particular method as long as a given point can be heated to 150° C.

1-2) A second point is determined with the first point as a reference.

1-3) Based on the first point and the second point, thermal resistance ($\theta_{d1}$) and thermal resistance ($\theta_{p1}$) are obtained by a method to be described later.

[2. Determination of Thermal Resistance ($\theta_{d2}$) and Thermal Resistance ($\theta_{p2}$)]

2-1) A third point is determined based on the first point. With respect to a surface including the third point, an entirety of the surface is heated to 40° C. It should be noted that this heating method is not limited to any particular method as long as an entire given surface can be heated to 40° C.

2-2) A fourth point is determined with the third point as a reference.

2-3) Based on the third point and the fourth point, thermal resistance ($\theta_{d2}$) and thermal resistance ($\theta_{p2}$) are obtained by a method to be described later.

[3. Verification of Partition Member According to First Aspect]

3-1) Using values of the thermal resistance obtained in 1-3) and 2-3) above, whether or not the partition member is the partition member according to the first aspect can be verified by verifying whether or not the values satisfy any of the Expressions 1 described earlier.

<Verification Method of Partition Member According to Second Aspect>

[1. Determination of Thermal Resistance ($\theta_{d1}$) and Thermal Resistance ($\theta_{p1}$)]

1-1) A first point on one surface of a partition member to be a verification object is determined. An entire surface including the first point is heated to 150° C. It should be noted that this heating method is not limited to any particular method as long as an entire given surface can be heated to 150° C.

1-2) A second point is determined with the first point as a reference.

1-3) Based on the first point and the second point, thermal resistance ($\theta_{d1}$) and thermal resistance ($\theta_{p1}$) are obtained by a method to be described later.

[2. Determination of Thermal Resistance ($\theta_{d2}$) and Thermal Resistance ($\theta_{p2}$)]

2-1) A third point is determined based on the first point. With respect to a surface including the third point, an entirety of the surface is heated to 40° C. It should be noted that this heating method is not limited to any particular method as long as an entire given surface can be heated to 40° C.

2-2) A fourth point is determined with the third point as a reference.

2-3) Based on the third point and the fourth point, thermal resistance ($\theta_{d2}$) and thermal resistance ($\theta_{p2}$) are obtained by a method to be described later.

[3. Verification of Partition Member According to Second Aspect]

3-1) Using values of the thermal resistance obtained in 1-3) and 2-3) above, whether or not the partition member is the partition member according to the second aspect can be verified by verifying whether or not the values satisfy any of the Expressions 1 described earlier.

In addition, in the partition member, the thermal resistance ($\theta_{d1}$) and the thermal resistance ($\theta_{p1}$) may satisfy Expression 2 below.

$$\theta_{d1}/\theta_{p1} \geq 1.0 \times 10^{2} \quad \text{(Expression 2)}$$

Furthermore, in the partition member, when a thickness of the unit battery in contact with the partition member is L [mm], the thickness of the partition member may be L/50 mm or more and L/5 mm or less. In this case, an assumed range of the thickness (L) of the unit battery constituting an assembled battery is normally 10 mm≤L≤100 mm and preferably 15 mm≤L≤80 mm.

In addition, an embodiment of the present invention may be an assembled battery including the partition member.

Furthermore, in the assembled battery, a heat amount that is transferred from a unit battery in which an abnormal temperature rise had occurred to a unit battery opposing, in the thickness direction of the partition member, the unit battery in which an abnormal temperature rise had occurred may be controlled by increasing the thermal resistance ($\theta_{d1}$) per unit area in the thickness direction of the partition member and reducing the thermal resistance ($\theta_{p1}$) per unit area in the plane direction.

There may be cases where, due to a part of or all of chemicals constituting an electrode, an electrolytic solution, or the like constituting a unit battery developing a decomposition reaction that is accompanied by heat generation inside the unit battery, the temperature of the unit battery rises and a part or an entire region of the unit battery reaches or exceeds 200° C. This state will be referred to as a state of an "abnormal temperature rise" or an "abnormal heat generation". In addition, a state where the chemicals constituting an electrode, an electrolytic solution, or the like constituting a unit battery is not developing a decomposition reaction that is accompanied by heat generation of a certain speed or higher inside a unit battery 200 will be referred to as a "normal" state.

With the assembled battery described above, due to an increase in thermal resistance per unit area in the thickness direction of the partition member, heat transfer to an opposing unit battery in the thickness direction of the partition member is suppressed. In addition, due to a decrease in thermal resistance per unit area in the plane direction, heat generated by a unit battery at which abnormal temperature rise had occurred is transferred in the plane direction to a unit battery or a member at which abnormal temperature rise had not occurred. Since the heat from a unit battery at which abnormal temperature rise had occurred is dispersed to unit batteries or members other than an opposing unit battery in the thickness direction of the partition member, the opposing unit battery in the thickness direction of the partition member can be prevented from reaching a state of an abnormal temperature rise.

In addition, an embodiment of the present invention may be a heat transfer control method of an assembled battery, the assembled battery including a partition member which partitions between a pair of unit batteries or a partition member which partitions between a unit battery and a member other than the unit battery, the partition member having a thickness direction and a plane direction perpendicular to the thickness direction, having a long axis direction and a short axis direction respectively included in the plane direction, and having a first surface and a second surface facing opposite directions in the thickness direction, the heat transfer control method including controlling a heat amount transferred via the partition member from the first unit battery by having the following satisfy Expression 1 below: when a first point on the first surface of the partition member reaches 150° C., thermal resistance ($\theta_{d1}$) per unit area in the thickness direction of the partition member which is defined by a difference in temperature between the first point and a second point at a plane-symmetrical position to the first point with respect to a division plane that bisects the partition member in the thickness direction on the second surface; thermal resistance ($\theta_{p1}$) per unit area in the plane direction of the partition member which is defined by a difference between a temperature at a first intersection point where a straight line connecting the first point and the second point and the division plane intersect each other and a temperature at a point on the division plane at a position at a distance that is ½ of a length of the partition member in the long axis direction from the first intersection point in the long axis direction; when the entire first surface is set to 40° C., thermal resistance ($\theta_{d2}$) per unit area in the thickness direction of the partition member which is defined by a difference in temperature between a third point at a same position as the first point and a fourth point at a same position as the second point; and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane at a position at a distance that is ½ of the length of the partition member in the long axis direction from the second intersection point in the long axis direction.

$$(\theta_{p1}/\theta_{p2})/(\theta_{d1}/\theta_{d2}) \leq 1.0 \times 10^{-4} \qquad \text{(Expression 1)}$$

In addition, an embodiment of the present invention may be a heat transfer control method of an assembled battery, the assembled battery including a partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries, the partition member having a long axis direction and a short axis direction respectively included in the plane direction and having a first surface and a second surface facing opposite directions in the thickness direction, the set of n-number of unit batteries being respectively in contact with the first surface and including a first unit battery and a third unit battery arranged apart from each other by a first distance, the set of m-number of unit batteries being in contact with the second surface and including a second unit battery which opposes the first unit battery across the partition member, the heat transfer control method including controlling a heat amount transferred via the partition member from the first unit battery by having the following satisfy Expression 1 below: when an entire surface with which the first unit battery is in contact is set to 150° C., thermal resistance ($\theta_{d1}$) per unit area in the thickness direction of the partition member which is defined by a difference in temperature between a first point at the first distance in the long axis direction toward a side of the third unit battery from a center point of a surface on which the first unit battery comes into contact with the partition member and a second point at a plane-symmetrical position to the first point with respect to a division plane that bisects the partition member in the thickness direction on the second surface; thermal resistance ($\theta_{p1}$) per unit area in the plane direction of the partition member which is defined by a difference between a temperature at a first intersection point where a straight line connecting the first point and the second point and the division plane intersect each other and a temperature at a point at a second distance which is ½ of a length by which the partition member and the first unit battery are in contact with each other in the long axis direction and which is longer than the first distance in the plane direction of the partition member on the division plane from the first intersection point on the division plane; when the entire surface with which the first unit battery is in contact is set to 40° C., thermal resistance ($\theta_{d2}$) per unit area in the thickness direction of the partition member which is defined by a difference in temperature between a third point at a same position as the first point and a fourth point at a same position as the second point; and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane separated by the second distance in the plane direction of the partition member from the first intersection point on the division plane.

$$(\theta_{p1}/\theta_{p2})/(\theta_{d1}/\theta_{d2}) \leq 1.0 \times 10^{-4} \quad \text{(Expression 1)}$$

<Partition Member>

Figure 1B:
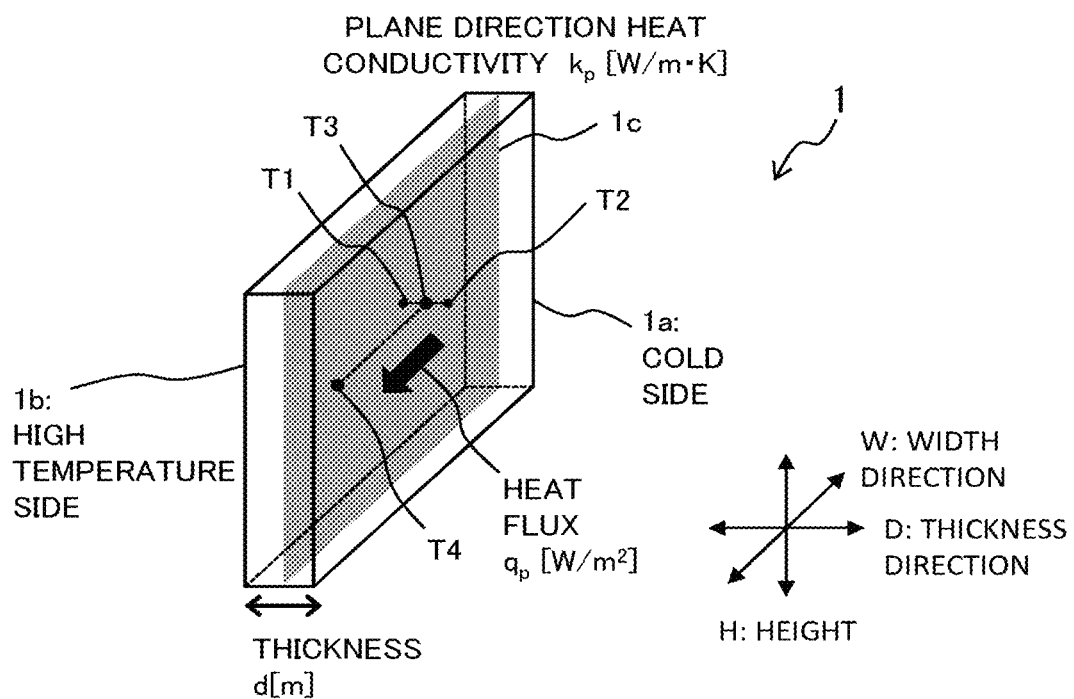
FIG. 1B is a diagram for illustrating thermal resistance in a plane direction of a partition member.

The partition member is a partition member which partitions between a pair of unit batteries or a partition member which partitions between a unit battery and a member other than the unit battery. Alternatively, the partition member may be a partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries. Hereinafter, in the embodiment and examples, it is assumed that a partition member includes the partition members described above. FIGS. 1A and 1B are diagrams illustrating a partition member. FIGS. 1A and 1B illustrate a partition member 1 that is a rectangular parallelepiped (a plate body) with a vertical length (a height), a horizontal length (a width), and a thickness. The partition member 1 has two surfaces, namely, a surface 1a and a surface 1b, facing opposite directions in the thickness direction.

In order to partition between unit batteries (or partition a unit battery from a member), the partition member 1 is arranged between the unit batteries (or between the unit battery and the member). In a state where the partition member 1 partitions between unit batteries (or partition a unit battery from a member), each of the surface 1a and the surface 1b is placed in a state of opposing the unit battery that is a partition object. In this case, each of the surface 1a and the surface 1b may be in a state of being in contact with the opposing unit battery or in a state of being in proximity with the opposing unit battery.

In the example shown in FIG. 1A, the surface 1a and the surface 1b may be used as "front and rear surfaces of the partition member in the thickness direction" or, in other words, "a first surface and a second surface facing opposite directions in the thickness direction". However, depending on how partitioning is performed using the partition member 1, there may be cases where one of the "front and rear surfaces of the partition member in the thickness direction" does not oppose a unit battery.

In an embodiment of the present invention, thermal resistance ($\theta_d$) per unit area in a thickness direction D of the partition member means heat transfer resistance per unit area in the thickness direction of the partition member. The thermal resistance ($\theta_d$) per unit area in the thickness direction of the partition member can be expressed using thermal conductivity ($k_d$ [W/m·K]) in the thickness direction of a material to be used as the partition member and a thickness (d [m]) of the partition member. As the thermal conductivity, when a phenomenon that influences heat transfer such as flux or phase transition proceeds concurrently in the partition member in an object environment, effective thermal conductivity containing such influences can be used.

The thermal resistance ($\theta_d$) per unit area in the thickness direction D of the partition member 1 shown in FIG. 1A will be described. Let thermal conductivity in the thickness direction of the partition member 1 be denoted by $k_d$ [W/m·K] and the thickness of the partition member be denoted by d [m]. In addition, let a temperature at a temperature measurement point T1 on a high-temperature side surface 1b be denoted by $t_1$ [° C.]. Furthermore, let a temperature at a point T2 be denoted by $t_2$ [° C.], the point T2 being a point on a low-temperature side surface 1a at a plane-symmetrical position to the point T1 with respect to a plane 1c (an example of the "division plane") that bisects the partition member 1 in the thickness direction D.

When $t_2$ is lower than $t_1$, a surface temperature difference $t_1-t_2$ is created between the side of the surface 1b and the side of the surface 1a of the partition member 1. In this case, when an effect of a heat flux in the plane direction is small, a heat flow (a heat flux) $q_d$ per unit area in the thickness direction of the partition member 1 can be expressed by Expression 3 below.

$$q_d = k_d(t_1-t_2)/d \ [\text{W/m}^2] \quad \text{(Expression 3)}$$

In this case, the heat flux $q_d$ in the thickness direction can be expressed using the thermal resistance ($\theta_d$) per unit area in the thickness direction by Expression 4 below.

$$q_d = (1/\theta_d)(t_1-t_2) \quad \text{(Expression 4)}$$

From Expressions 3 and 4, the thermal resistance ($\theta_d$) per unit area in the thickness direction can be expressed using thermal conductivity $k_d$ in the thickness direction of the partition member 1 and a thickness (d) of the partition member. In other words, the thermal resistance ($\theta_d$) per unit area in the thickness direction can be expressed by Expression 5 below.

$$\theta_d = d/k_d \ [\text{m}^2\cdot\text{K/W}] \quad \text{(Expression 5)}$$

It should be noted that the temperature measurement point T1 can be an arbitrary point on the surface 1b. With an arbitrary point on the surface 1b as the temperature measurement point T1, the thermal resistance ($\theta_d$) per unit area in the thickness direction at the point T1 can be calculated according to the method described above. The point T1 is an example of the "first point" and the "third point". The point T2 is an example of the "second point" and the "fourth point".

Thermal resistance ($\theta_p$) per unit area in a plane direction P of the partition member 1 shown in FIG. 1B will now be described. Let thermal conductivity in the plane direction P of the partition member 1 be denoted by $k_p$ [W/m·K]. As the thermal conductivity, when a phenomenon that influences heat transfer such as flux or phase transition proceeds concurrently in the partition member in an object environment, effective thermal conductivity containing such influences can be used. Let a temperature at a point T3 where a straight line connecting the point T1 and the point T2 intersects with the plane 1c which bisects the partition member 1 in the thickness direction D be denoted by $t_3$ [° C.]. Let a temperature at a point T4 separated from the point T3 by a distance of $L_t$ [m] in the long axis direction of the partition member 1 on the plane 1c be denoted by $t_4$ [° C.]. The point T3 is an example of the "first intersection point" and the "second intersection point".

When $t_4$ is lower than $t_3$, a temperature difference $t_3-t_4$ is created between the point T3 and the point T4 of the partition member 1. In this case, when an effect of a heat flux in the thickness direction is small, a heat flow (a heat flux) $q_p$ per unit area in the plane direction of the partition member 1 can be expressed by Expression 6 below.

$$q_p = k_p(t_3-t_4)/L_L \ [\text{W/m}^2] \quad \text{(Expression 6)}$$

In this case, the heat flux $q_p$ in the plane direction can be expressed using the thermal resistance ($\theta_p$) per unit area in the plane direction by Expression 7 below.

$$q_p = (1/\theta_p)(t_3-t_4) \quad \text{(Expression 7)}$$

From Expressions 6 and 7, the thermal resistance ($\theta_p$) per unit area in the plane direction can be expressed using thermal conductivity $k_p$ in the plane direction of the partition member 1 and the distance ($L_t$) between the point T3 and the point T4 in the partition member 1. In other words, the thermal resistance ($\theta_p$) per unit area in the plane direction can be expressed by Expression 8 below.

$$\theta_p = L_t/k_p \ [m^2 \cdot K/W] \qquad \text{(Expression 8)}$$

Thermal resistance ($\theta_p$) per unit area in a plane direction P of the partition member 1 shown in FIG. 1C will now be described. A pair formed by a unit battery 21 and a unit battery 23 and a pair formed by a unit battery 22 and a unit battery 24 are partitioned by the partition member 1. A distance between the unit battery 21 and the unit battery 23 and a distance between the unit battery 22 and the unit battery 24 are x [m] (an example of the "first distance"). Let a point separated by x [m] toward a side of the unit battery 21 in the long axis direction of the partition member 1 from a center point T5 of a surface (an example of the "first surface") by which the unit battery 23 is in contact with the partition member be a point T1. Let a point at a plane-symmetrical position to the point T1 with respect to a division plane that bisects the partition member 1 in the thickness direction D on a surface (an example of the "second surface") by which the unit battery 24 is in contact with the partition member 1 be a point T2. Let a temperature at a point T3 where a straight line connecting the point T1 and the point T2 intersects with the division plane be denoted by $t_3$ [° C.]. When a length of the unit battery 23 in a width direction is $L_W$ [m], let a temperature at a point T4 separated from the point T3 by a distance of $L_W/2$ [m] (an example of the "second distance") in the long axis direction of the partition member 1 on the division plane be denoted by $t_4$ [° C.]. The point T3 is an example of the "first intersection point" and the "second intersection point". In addition, let x [m] be shorter than the distance $L_W/2$ [m]. When the thermal conductivity in the plane direction P of the partition member 1 is denoted by $k_p$ [W/m·K], the thermal resistance ($\theta_p$) per unit area in the plane direction P of the partition member 1 shown in FIG. 1C is calculated in a similar manner to Expressions 6 to 8 described above. However, the calculation uses $L_W/2$ [m] as the distance between the point T3 and the point T4.

Figure 2A:
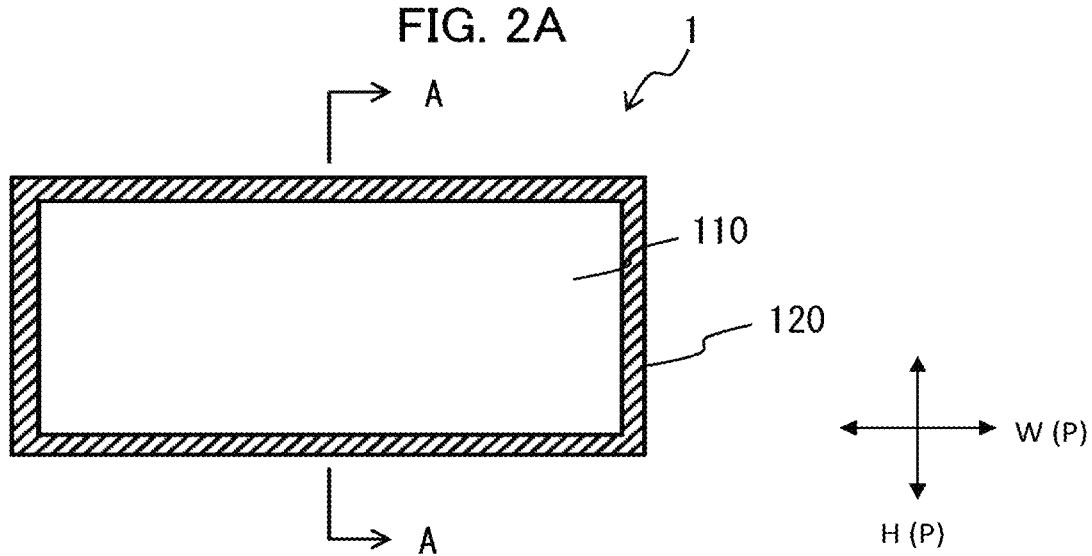
FIG. 2A is a plan view showing a configuration example of a partition member according to an embodiment.
Figure 2B:
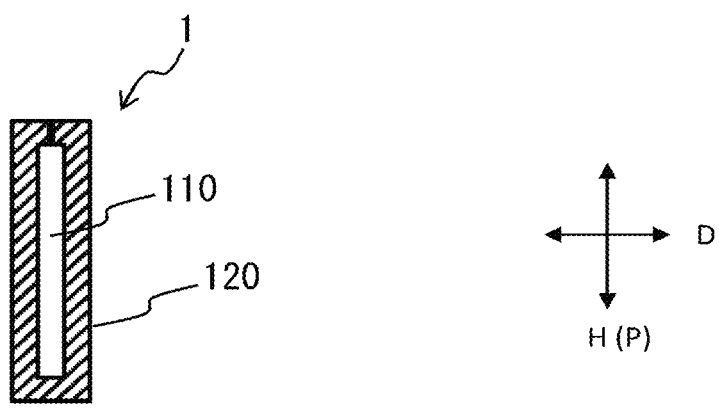
FIG. 2B is a diagram showing an end surface when the partition member shown in FIG. 2A is cut along a line A-A.
Figure 2C:
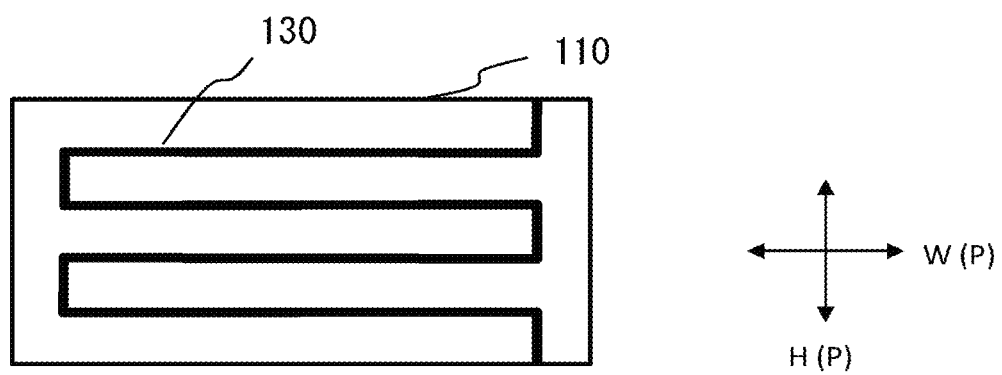
FIG. 2C is a diagram showing an example of a flow path included in a fluid holding portion housed inside a partition member.

FIG. 2A is a plan view showing a configuration example of the partition member according to the embodiment. FIG. 2B is a diagram showing an end surface when the partition member shown in FIG. 2A is cut along a line A-A. For example, an external shape of the partition member 1 is formed in a flat plate shape with a thickness or in a sheet shape. FIG. 2C is a diagram showing an example of a flow path included in a fluid holding portion housed inside the partition member.

In the example shown in FIGS. 2A and 2B, the partition member 1 is formed in a flat plate shape having a height, a width, and a thickness and having the thickness direction D and the plane direction P. The plane direction P is a direction perpendicular to the thickness direction D. As long as the plane direction P is perpendicular to the thickness direction D, the plane direction P includes a height direction H, a width direction W, and a diagonal direction of the partition member 1. The diagonal direction includes an arbitrary direction other than the height direction H and the width direction W in the plane direction P.

The partition member 1 is used in order to partition between, in the thickness direction D thereof, a pair of unit batteries or a unit battery and a member other than the unit battery. In addition, the partition member 1 is used in order to partition any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and members other than unit batteries.

When a thickness of a unit battery constituting an assembled battery is L [mm], the thickness of the partition member 1 is preferably L/50 mm or more and L/5 mm or less. In this case, an assumed range of the thickness (L) of the unit battery constituting an assembled battery is normally 10 mm≤L≤100 mm and preferably 15 mm≤L≤80 mm.

The partition member 1 internally includes a fluid of which a boiling point at ordinary pressure is 80° C. or higher and 250° C. or lower and a flow path of the fluid that extends along the plane direction of the partition member 1.

<Fluid>

The "fluid of which a boiling point at ordinary pressure is 80° C. or higher and 250° C. or lower" is a fluid of which the boiling point at ordinary pressure (1 atm) is 80° C. or higher and 250° C. or lower. The fluid is not particularly restricted as long as the fluid's boiling point is as described above and may assume either a liquid state or a gaseous state at ordinary pressure. Single-component fluids of which the boiling point at ordinary pressure (1 atm) is 80° C. or higher and 250° C. or lower will be exemplified below. Even if a boiling point of a single-component fluid is outside of this temperature range, when the single-component fluid is used in a mixture fluid of two or more components and a boiling point of the mixture fluid is within this temperature range, the mixture fluid can be used as the fluid according to an embodiment of the present invention.

For example, the fluid preferably includes at least one selected from a group consisting of water, alcohols, esters, ethers, ketones, hydrocarbons, fluorine-based compounds, and silicone-based oils.

Examples of alcohols that can be used in the fluid include alcohols containing three to eight carbon atoms such as propanol, isopropanol, butanol, benzyl alcohol, and phenyl ethyl alcohol and bivalent or higher alcohols such as ethylene glycol, propylene glycol, and alkylene glycol. These alcohols can be used independently or as a mixture of two or more alcohols.

Examples of esters that can be used in the fluid include alkyl aliphatic carboxylic ester, alkyl diester carbonate, alkyl diester oxalates, and ethylene glycol fatty acid ester. Examples of alkyl aliphatic carboxylic esters include lower alkyl aliphatic carboxylic esters including: lower alkyl formates such as methyl formate, n-butyl formate, and isobutyl formate; lower alkyl acetates such as n-propyl acetate, isopropyl acetate, n-butyl acetate, and isobutyl acetate; and lower alkyl propionates such as ethyl propionate, n-propyl propionate, isopropyl propionate, n-butyl propionate, and isobutyl propionate. Examples of alkyl diester carbonates include lower alkyl diester carbonates such as dimethyl carbonate, diethyl carbonate, dibutyl carbonate, and methyl ethyl carbonate. Examples of alkyl diester oxalates include lower alkyl diester oxalates such as dimethyl oxalate and diethyl oxalate. Examples of ethylene glycol ester acetates include propyl acetate and butyl acetate. Examples of ethylene glycol fatty acid esters include ethylene glycol ester acetate. These esters can be used independently or as a mixture of two or more esters.

Examples of ethers that can be used in the fluid include n-butyl ether, n-propyl ether, and isoamyl ether. These ethers can be used independently or as a mixture of two or more ethers.

Examples of ketones that can be used in the fluid include ethyl methyl ketone and diethyl ketone. These ketones can be used independently or as a mixture of two or more ketones.

Examples of hydrocarbons that can be used in the fluid include heptane, octane, nonane, decane, toluene, and xylene. These hydrocarbons can be used independently or as a mixture of two or more hydrocarbons.

Examples of fluorine-based compounds that can be used in the fluid include 1,1,2,2,3,3,4-heptafluorocyclopentane (HFC-c447ef) and 1,1,1,2,2,3,3,4,4,5,5,6,6-tridecafluorooctane (HFC-76-13sf) which are refrigerants. These fluorine-based compounds can be used independently or as a mixture of two or more fluorine-based compounds.

Examples of silicone-based oils that can be used in the fluid include modified silicone oils such as methylpolysiloxane, methylphenylpolysiloxane, cyclic methylsiloxane, and silicone polyether copolymers. These silicone-based oils can be used independently or as a mixture of two or more silicone-based oils.

<Fluid Holding Portion>

A fluid holding portion 110 for holding the fluid described above is preferably provided inside the partition member 1. In the example shown in FIG. 2C, the fluid holding portion 110 is formed in a flat plate shape or a sheet shape and the fluid holding portion 110 is sealed by a packaging material 120 with a flat plate shape or a sheet shape. The fluid holding portion 110 has a fluid flow path 130 such as that shown in FIG. 2C.

The fluid holding portion 110 is preferably formed by a material containing a porous body. The porous body preferably includes at least one of a fibrous layer and a particle layer. For example, the porous body including a fibrous layer is preferably at least one selected from a group consisting of a glass fiber sheet, a ceramic fiber sheet, paper, a cotton sheet, a porous ceramic sheet, a porous glass sheet, a polyimide fiber sheet, an aramid fiber sheet, and a polytetrafluoroethylene (PTFE) fiber sheet. In addition, for example, the porous body including a particle layer is preferably at least one selected from a group consisting of silica particles, alumina particles, zeolite particles, glass particles, and carbon particles. The entire fluid holding portion 110 may be formed by a porous body. In the following description, a case where the fluid holding portion 110 is formed by a porous body will be exemplified. The packaging material 120 includes a porous body.

A fluid is held in cavities in the porous body included in the fluid holding portion 110 and in the flow path 130. For example, by soaking the fluid holding portion 110 in a fluid so as to be impregnated by the fluid, the fluid holding portion 110 is capable of holding the fluid. Alternatively, the fluid holding portion 110 can be impregnated by the fluid by introducing (injecting) the fluid from an opening of the packaging material 120 which internally houses the fluid holding portion 110.

When the fluid holding portion 110 enters a state where the held fluid flows to the outside and the cavities and the flow path 130 include air or a gas such as vapor of the held fluid, a heat transfer coefficient of a portion that does not include the fluid drops and the fluid holding portion 110 functions as a heat insulating layer.

<Flow Path>

The partition member 1 has a flow path of fluid which extends in the plane direction. In the present embodiment, the flow path 130 preferably includes a space in which a length by which the fluid can move continues for 1 mm or more and in which a diameter of a sphere inscribable in this space is 0.1 mm or more in a region that occupies 90% or more of a volume of this space.

FIG. 2C shows an example of the flow path 130 included in the fluid holding portion 110. In the example shown in FIG. 2C, the flow path 130 is formed in a meandering shape in which a flow path extending in the height direction H and a flow path extending in the width direction W of the fluid holding portion 110 (the partition member 1) are coupled to each other. Each end of the flow path 130 reaches an outer edge of the fluid holding portion 110. However, shapes of the flow paths and the number of the flow paths forming the flow path 130 can be set as appropriate and it is not imperative that ends of the flow path 130 reaches the outer edge of the fluid holding portion 110 as shown in FIG. 2C. For example, the flow path 130 is preferably formed such that a length of the flow path 130 in the height direction or the width direction of the partition member 1 is ½ or more of a length of the partition member 1 in the height direction or the width direction. In addition, the flow path 130 need not necessarily be formed in a straight line and may be formed in a curved line.

The flow path 130 may be a groove formed on a surface of the fluid holding portion 110, a linear hole that penetrates the fluid holding portion 110, or a cavity formed inside the fluid holding portion 110. The flow path 130 may be formed by machining a single member made of a material of the fluid holding portion as described above or the flow path 130 may be formed by combining a plurality of materials of the fluid holding portion. Since the flow path 130 is formed in the plane direction P, the flow path 130 may include cases where the direction of the flow path 130 slightly deviates from the plane direction P in addition to the flow path 130 extending in the plane direction P. As described above, with the partition member 1 according to the present embodiment, preferably, a porous body (the fluid holding portion 110) impregnated with a fluid is provided inside the partition member 1 and the flow path 130 is formed in the porous body.

A width of the flow path 130 is desirably 0.1 mm or more and 10 mm or less. When the width of the flow path 130 is less than 0.1 mm, moving resistance of the fluid becomes excessively large and may cause $\theta_{p1}$ to be a large value. As a result, $\theta_{p1}/\theta_{d2}$ may become a large value and may make it difficult to satisfy Expression 1. In addition, when the width of the flow path 130 becomes larger than 10 mm, strength as the partition member 1 may decline and may make it more prone to deformation against stress applied to the partition member 1 from the outside.

<Packaging Material>

The packaging material 120 encapsulates the fluid holding portion 110 and seals the fluid holding portion 110 holding the fluid. As the packaging material 120, for example, a resin sheet, a resin film, or a resin pouch can be applied. For example, by sandwiching the fluid holding portion 110 with two resin sheets or resin films or a half-folded resin sheet or resin film and performing thermal fusion or adhesion, the fluid holding portion 110 holding the fluid is sealed. However, the packaging material 120 is not necessarily imperative and, for example, when the fluid holding portion 110 is formed by a porous material with a high water absorption rate or the like, the fluid holding portion 110 is capable of holding a desired amount of fluid for a desired period of time even without the packaging material 120.

In addition, since the fluid acts as a heat transfer medium, the more fluid included in the fluid holding portion 110, the greater the promotion of heat transfer. When the fluid holding portion 110 does not include a fluid, the fluid holding portion 110 functions as a heat insulator and an effect of promoting heat transfer in the plane direction decreases. Therefore, the fluid holding portion 110 preferably holds a prescribed amount of fluid. Specifically, relative to a combined volume of a volume of the flow path and a volume of gaps in the porous body, a fluid that is 20% or more of the combined volume is preferably held and a fluid that is 50% or more of the combined volume is more preferably held while, on the other hand, an upper limit is not particularly limited and is normally 100%. The fluid need not necessarily be a liquid within a range of 80° C. or higher and 250° C. or lower and may be in a non-liquid state.

More desirably, thermal conductivity as a porous body is smaller than thermal conductivity of the fluid to be held by the fluid holding portion 110. Accordingly, the fluid included in the fluid holding portion 110 decreases due to vaporization of the fluid at 150° C. and, as a result, the value of $\theta_{d1}$ increases. Furthermore, since the value $\theta_{d1}/\theta_{d2}$ increases, conditions of Expression 1 can be more readily satisfied. Specifically, desirably, at least one of the fibrous layer and the particle layer described above is included as the porous body and porosity of the porous body ranges from 10 to 90%. When the porosity is lower than 10%, a holding amount of the fluid may decrease and the value of $\theta_{d1}/\theta_{d2}$ may not increase. On the other hand, when the porosity is higher than 90%, there is a risk that a stable shape as the partition member 1 can no longer be maintained due to the porous body losing its mechanical strength and distortion of the porous body with respect to pressing pressure becoming excessively large.

<Assembled Battery>

Next, an assembled battery to which the partition member 1 is applied will be described. For example, the assembled battery is applied to a battery pack to be mounted to an electric vehicle (EV), a hybrid electric vehicle (HEV), a plug-in hybrid electric vehicle (PHEV), electric heavy machinery, an electric motorcycle, a power-assisted bicycle, an ocean vessel, an aircraft, a train, an uninterruptible power supply (UPS), a home power storage system, and a storage battery system for power system stabilization which utilizes renewable energy such as wind power, solar power, tidal power, and geothermal power. However, the assembled battery may be used as a power source for supplying power to devices other than an EV and the like described above.

<Unit Battery>

Figure 3A:
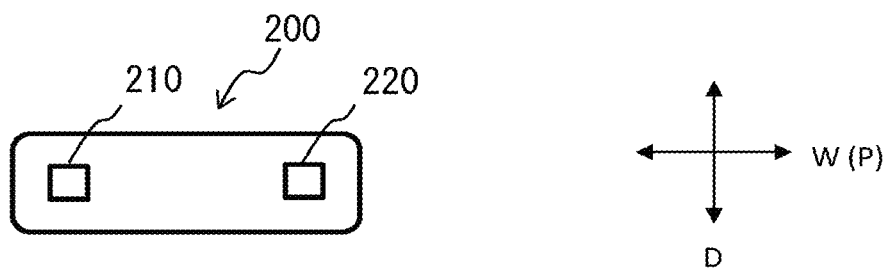
FIG. 3A is a plan view showing an example of a unit battery constituting an assembled battery.
Figure 3B:
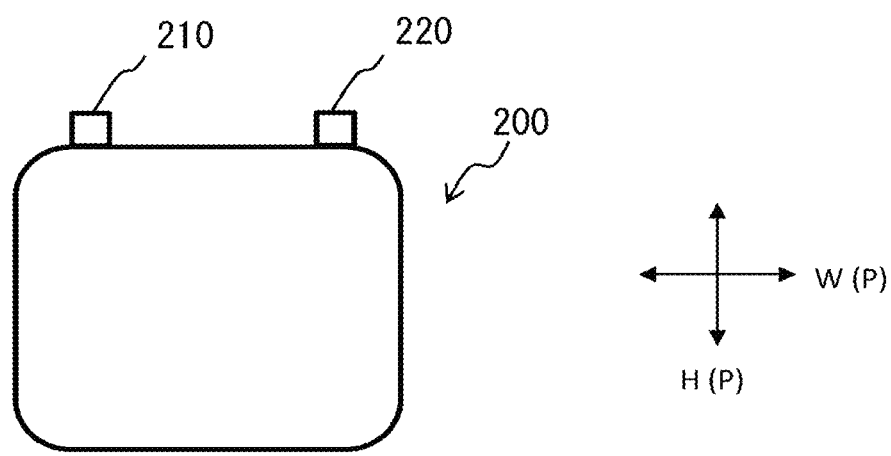
FIG. 3B is a plan view showing an example of a unit battery constituting an assembled battery.
Figure 3C:
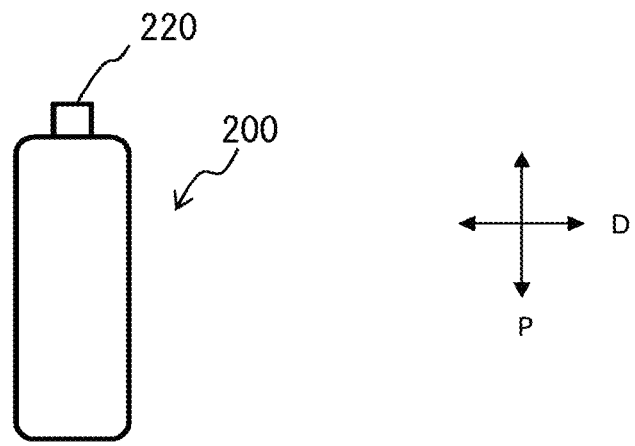
FIG. 3C is a side view showing an example of a unit battery constituting an assembled battery.

FIG. 3A is a plan view showing an example of a unit battery constituting an assembled battery, FIG. 3B is a plan view showing an example of a unit battery, and FIG. 3C is a side view showing an example of a unit battery.

The unit battery 200 has a rectangular parallelepiped shape with a vertical length (thickness), a horizontal length (width), and a height, and a terminal 210 and a terminal 220 are provided on an upper surface thereof. The unit battery 200 is, for example, a lithium ion secondary battery which is capable of storing and discharging lithium ions and which includes a positive electrode, a negative electrode, and an electrolyte. In addition to a lithium ion secondary battery, a secondary battery such as a lithium ion all-solid-state battery, a nickel metal-hydride battery, a nickel-cadmium battery, or a lead acid battery may be applied.

<Assembled Battery>

Figure 4:
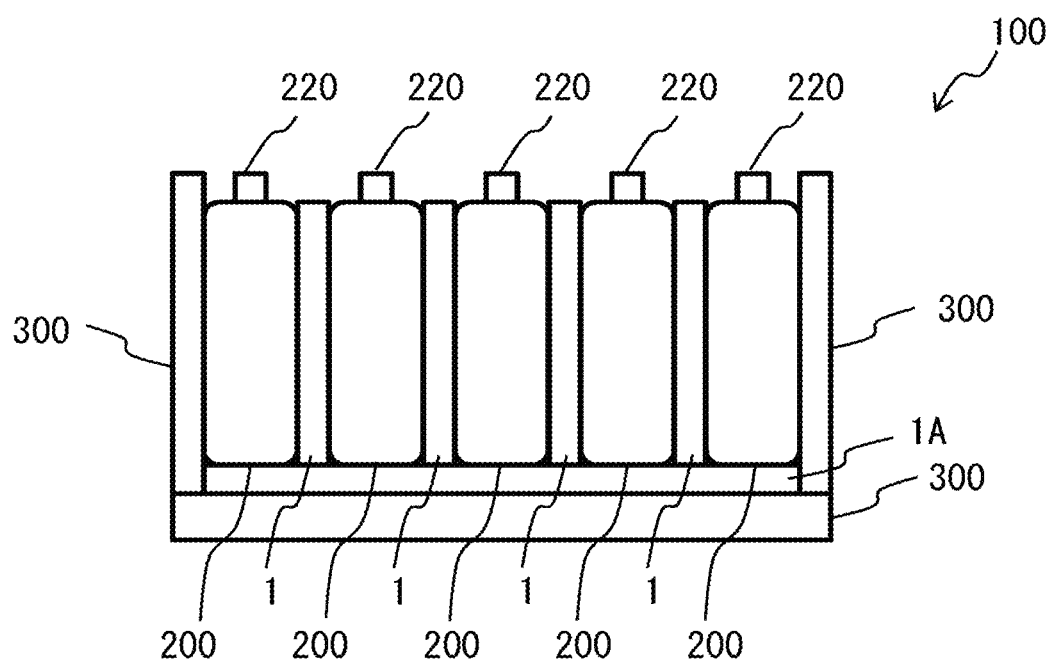
FIG. 4 is a diagram showing an end surface when an assembled battery formed using a plurality of unit batteries is cut along a plane in a height direction that passes through terminals of the unit batteries.

FIG. 4 is a diagram showing an end surface when an assembled battery formed using a plurality of unit batteries is cut along a plane in a height direction H that passes through terminals of the unit batteries. An assembled battery 100 houses a plurality of the unit batteries 200 in a housing 300 having a bottom surface and four side surfaces. The partition member 1 described above is arranged between the respective unit batteries 200, and adjacent unit batteries 200 are partitioned in a thickness direction D of the partition member 1. The assembled battery 100 outputs prescribed power by having a positive electrode terminal (for example, the terminal 210) and a negative electrode terminal (for example, the terminal 220) be electrically connected in series by a bus bar (not illustrated). As shown in FIG. 4, in the assembled battery 100, a partition member IA configured in a similar manner to the partition member 1 may be arranged between the bottom surface of the housing 300 and each unit battery 200.

<Operation of Partition Member>

Figure 5:
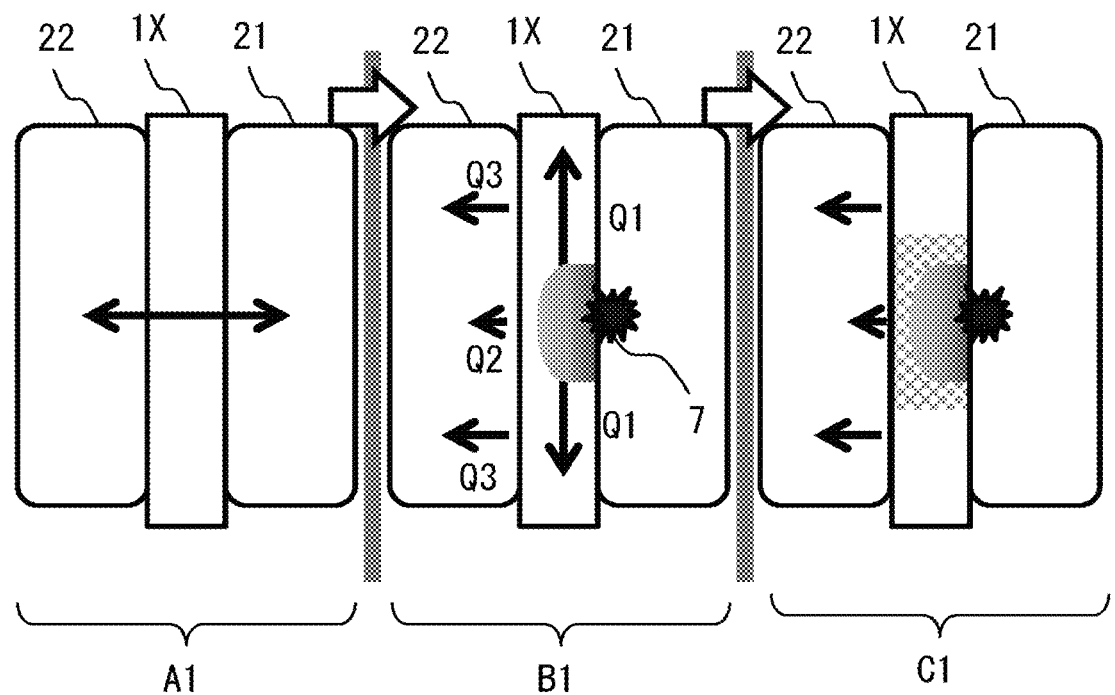
FIG. 5 is a diagram schematically showing a first case in which a localized high-temperature location occurs in a single unit battery.

FIG. 5 is a diagram schematically showing a first case in which localized abnormal heat generation occurs in a single unit battery. A1 in FIG. 5 assumes normal operation of the assembled battery. A unit battery 21 and a unit battery 22 are partitioned by a partition member 1X.

During normal operation (normal temperature), as indicated by A1 in FIG. 5, a fluid in a liquid state is uniformly distributed in the fluid holding portion 110 of the partition member 1X. Therefore, the partition member 1X has desired thermal conductivity between the unit batteries 200 (between the unit battery 21 and the unit battery 22) which oppose each other across the partition member 1X.

Let us assume a case where a localized abnormal heat generation occurs in the unit battery 21 as indicated by B1 in FIG. 5. In this case, the fluid present in a portion of the fluid holding portion 110 which opposes a localized high-temperature portion (7 in B1 in FIG. 5) of the unit battery 21 vaporizes. The vaporized fluid moves together with heat to a location that does not oppose a high-temperature portion of the partition member 1X (refer to an arrow Q1 in B1). Since a temperature of the location not opposing the high-temperature portion is lower than the high-temperature portion, the vaporized fluid condenses and returns to a liquid state. The fluid having become a liquid moves to a high-temperature portion together with latent heat. Circulation of the fluid accompanying such movements of the fluid in the plane direction causes effective thermal conductivity in the plane direction to increase and heat in the high-temperature portion is transported and cooled. In addition, since a temperature of fluid which is on a side of a flat surface 1a and which is not vaporized among fluid at a position corresponding to the high-temperature portion 7 is kept at or below a boiling point thereof, the fluid suppresses movement of heat from the unit battery 21 to the unit battery 22 by alleviating a temperature difference that occurs between a localized high-temperature portion (7 in B1 in FIG. 5) of the unit battery 21 and a portion facing the localized high-temperature portion of the unit battery 21 among the unit battery 22 and suppresses a heat rise of the unit battery 22 (refer to an arrow Q2 in B1). In other words, when a localized abnormal heat generation occurs in the unit battery 21, thermal resistance in the plane direction of the partition member 1X decreases while thermal resistance in the thickness direction of the partition member 1X increases.

In the fluid holding portion 110, in a portion not opposing the high-temperature portion 7, the fluid is in a liquid state and a heat transfer coefficient to the unit battery 22 which is close to that during normal time is maintained. Accordingly, the unit battery 22 acts as a heat sink and receives heat having moved from the high-temperature portion 7 (refer to an arrow Q3 in B1). As a result, the vaporized fluid in the fluid holding portion 110 is condensed and restored to a liquid to return to the side of the high-temperature portion 7. In other words, the fluid circulates inside the partition member 1X (the fluid holding portion 110).

In a state where liquid-state fluid is held in the fluid holding portion 110, the fluid acts as a transfer medium of heat from the unit battery 21 and has prescribed thermal conductivity in the thickness direction of the partition member 1X. On the other hand, when the fluid vaporizes, thermal conductivity of a portion of the fluid holding portion 110 where the vaporized fluid is present declines and the portion acts as a heat insulating layer. As shown in C1 in FIG. 5, when a state is created where a part of the fluid holding portion 110 includes the fluid in a gaseous state or air, the fluid holding portion 110 functions as a heat insulating layer. In a portion 1Xa where the fluid holding portion 110 of the partition member 1X includes the fluid in a gaseous state or air, thermal resistance in the thickness direction of the partition member increases and an amount of heat transferred to the unit battery 22 is suppressed. Therefore, a situation where the unit battery 22 receives heat from the unit battery 21 and causes abnormal heat generation can be avoided.

FIG. 6 is a diagram schematically showing a second case in which one of a plurality of unit batteries arranged side by side on one of two surfaces in the thickness direction of the partition member reaches a high temperature. A2 in FIG. 6 assumes normal operation of the assembled battery. A pair formed by the unit battery 21 and a unit battery 23 and a pair formed by the unit battery 22 and a unit battery 24 are partitioned by the partition member 1X.

During normal operation (normal temperature), as indicated by A2 in FIG. 6, a fluid in a liquid state is uniformly distributed in the fluid holding portion 110 of the partition member 1X. Therefore, the partition member 1X has desired thermal conductivity between the unit batteries 2 (between the unit battery 21 and the unit battery 22 and between the unit battery 23 and the unit battery 24) which oppose each other across the partition member 1X.

Let us assume a case where a state of abnormal heat generation is created in the unit battery 24 as indicated by B2 in FIG. 6. In this case, fluid present in a portion of the fluid holding portion 110 which corresponds to a region 1h of the partition member 1X opposing the unit battery 24 vaporizes and moves together with heat in the plane direction of the partition member 1X (refer to an arrow Q1 in B2). In other words, thermal resistance in the plane direction decreases. In addition, since a temperature of fluid which is on a side of a region if of the partition member 1X and which is not vaporized among the fluid at a position corresponding to the region 1h is kept at or below a boiling point thereof, the fluid suppresses movement of heat from the unit battery 24 to the unit battery 23 which is a unit battery 200 (also referred to as an "opposing-side unit battery 200") which opposes the unit battery 24 across the partition member 1X by alleviating a temperature difference that is created between the unit battery 24 and the unit battery 23 and suppresses a heat rise of the unit battery 23 (refer to an arrow Q2 in B2). In other words, when the unit battery 24 enters a state of abnormal heat generation, thermal resistance in the plane direction of the partition member 1X decreases while thermal resistance in the thickness direction of the partition member 1X increases.

When respective temperatures of the unit battery 21 which opposes a region 1e of the partition member 1X and the unit battery 22 which is an opposing-side unit battery 200 of the unit battery 21 and which opposes a region 1g of the partition member 1X are not in a state of abnormal heat generation (lower than abnormal heat generation or at normal temperature), the unit battery 21 and the unit battery 22 function as a heat sink and receives heat from the partition member 1X (refer to an arrow Q3 in B2). Accordingly, the vaporized fluid in the fluid holding portion 110 is condensed and restored to a liquid to return to the side of the high-temperature portion. In other words, the fluid circulates inside the partition member 1X (the fluid holding portion 110) and effective thermal conductivity in the plane direction increases.

As shown in C2 in FIG. 6, let us assume that the vaporized fluid is released from the partition member 1X and a state is created in which the fluid holding portion 110 includes the fluid in a gaseous state or air. In this case, a heat insulating layer is formed by the air (the gas-phase fluid) included in the fluid holding portion 110 and a heat transfer coefficient to the opposing-side unit battery 23 declines. Therefore, a situation where the unit battery 23 receives heat from the unit battery 24 and causes abnormal heat generation can be avoided.

EXAMPLES

Next, while specific aspects of an embodiment of the present invention will be described in further detail using examples, it is to be understood that an embodiment of the present invention is not limited by the examples.

In the respective examples and comparative examples described below, focusing on heat transfer via the partition member 1 arranged between unit batteries (in the respective examples and comparative examples, also referred to as cells) 200 among heat transfer paths from a cell 200 in which abnormal heat generation has occurred to other cells 200, a possibility of suppressing fire spread between the cells 200 by the partition member 1 is examined. As assembled batteries that are evaluation objects, as shown in FIGS. 7A and 8, a two-dimensional simplified assembled battery model constituted by two cells and a two-dimensional simplified assembled battery model constituted by four cells were constructed.

Figure 7A:
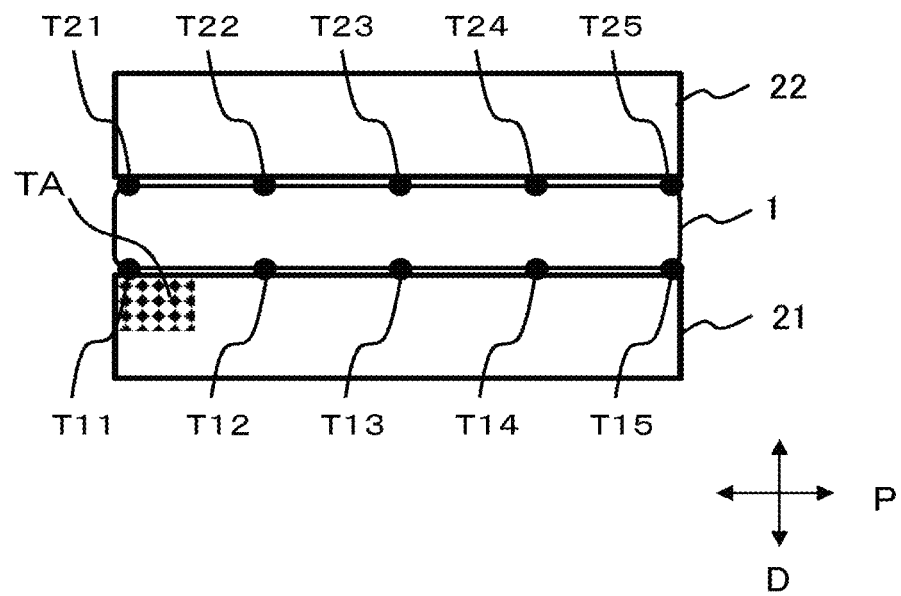
FIG. 7A illustrates a two-dimensional coordinate system simplified assembled battery model that is constituted by two cells.

In the assembled battery model shown in FIG. 7A, a cell 21 and a cell 22 are partitioned in the thickness direction D by the partition member 1. FIG. 7A shows an end surface in a case where the cell 21 and the cell 22 are cut along a plane in the height direction H which is perpendicular to the plane direction. In the assembled battery model constituted by two cells, $6.0 \times 10^9$ [W/m$^3$] is given as a heat generation speed corresponding to time of occurrence of an abnormality to an end TA in the plane direction P of the cell 21.

Figure 8:
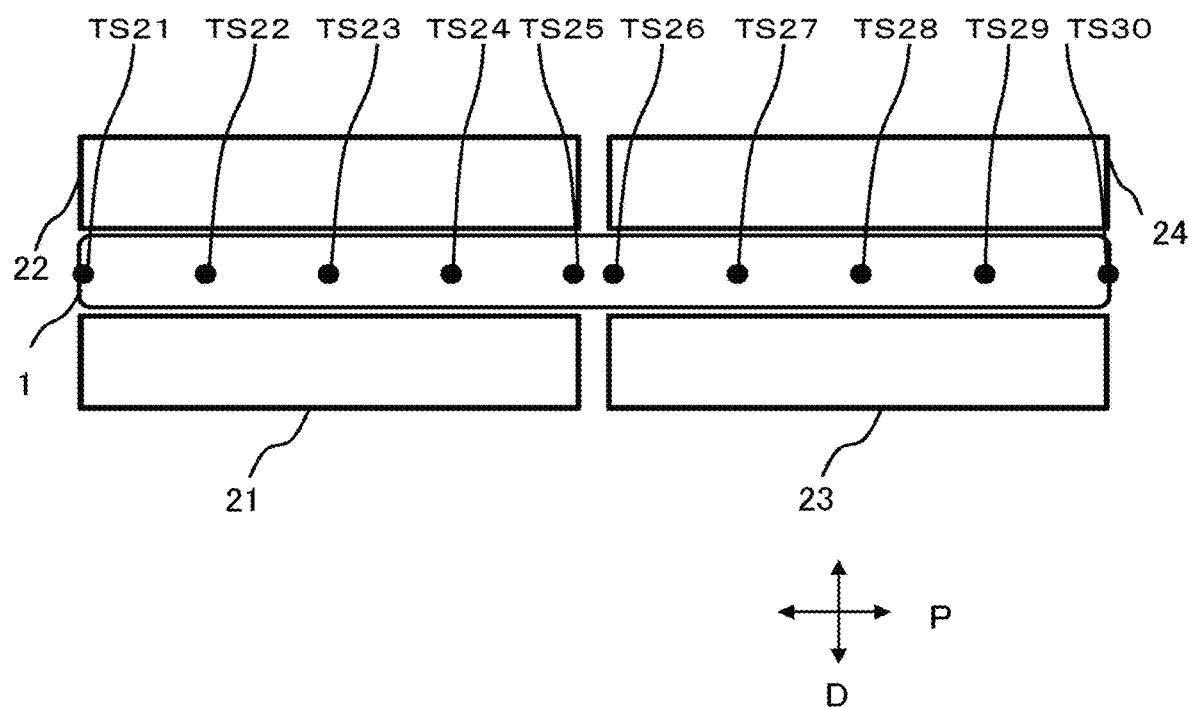
FIG. 8 illustrates a two-dimensional coordinate system simplified assembled battery model that is constituted by four cells.

In addition, in the assembled battery model shown in FIG. 8, a cell 21 and a cell 23 which are arranged side by side in the plane direction P and a cell 22 and a cell 24 respectively opposing the cell 21 and the cell 23 are partitioned in the thickness direction D by the partition member 1. FIG. 8 shows an end surface in a case where the cells 21 to 24 are cut along a plane in the height direction H which is perpendicular to the plane direction. In the assembled battery model constituted by four cells, an amount of heat generation of $1.3 \times 10^9$ [J/m$^3$] corresponding to time of occurrence of thermal runaway (a total amount of heat generation as estimated based on a heat amount evaluation of a cell 200 using an NMC-based positive electrode) is given to the cell 21.

In conditions of the respective examples and comparative examples described below, a temperature of each cell 200, a temperature of the partition member 1, and thermal resistance per unit area of the partition member 1 were estimated by solving a heat conduction equation using a finite element method. In this case, analysis was performed using COMSOL Multiphysics which is general physical simulation software manufactured by COMSOL AB and by referring to References 1 and 2 below. (Reference 1: Japanese Patent Application Laid-open No. 2006-010648, Reference 2: R. M. Spotnitz et al., J. Power Sources 163, 1080-1086, (2007)).

First, as a first case, when the end TA of the cell 21 in FIG. 7A reaches a localized high temperature, a temperature inside the adjacent cell 22, a temperature of the partition member 1, and thermal resistance per unit area of the partition member 1 with respect to both the thickness direction D and the plane direction P were estimated and effects such as suppressing fire spread due to a variation in heat transfer resistance of the partition member 1 in both the thickness direction D and the plane direction P were evaluated. For the temperature inside each cell 2, a measurement of an internal average temperature of an electrode body (a structure including an electrode, a separator, and an electrolytic solution) was assumed.

Next, as a second case, when an abnormal heat generation of the cell 21 occurs in FIG. 8, internal temperatures of the surrounding cells 22, 23, and 24, a temperature of the partition member 1, and thermal resistance per unit area of the partition member 1 with respect to both the thickness direction D and the plane direction P were estimated, and effects such as suppressing fire spread due to a variation in heat transfer resistance of the partition member 1 in both the thickness direction D and the plane direction P were evaluated. For the temperature inside each cell 2, a measurement of an internal average temperature of an electrode body (a structure including an electrode, a separator, and an electrolytic solution) was assumed.

<First Case (Plane Direction Heat Transfer Control in Single Cell)>

Example 1-1

In example 1-1, the partition member 1 was assumed to be a sophisticated partition member having a switching function which, when an internal average temperature of a portion in contact with a localized high-temperature portion generated by giving an amount of heat generation to the inside of the cell 21 inside the partition member 1 reaches a prescribed temperature, thermal conductivity varies in both the thickness direction D and the plane direction P, and film thickness was set to 2.0 mm.

The partition member 1 having the switching function is, for example, a partition member which has the thickness direction D and the plane direction P that is perpendicular to the thickness direction D and which partitions between unit batteries or between a unit battery and a member other than the unit battery, the partition member being a structure designed to internally include a fluid with a boiling point at ordinary pressure of 80° C. or higher and 250° C. or lower and a flow path of the fluid which extends in the plane direction. Due to such a structure, a switching temperature of the partition member 1 was set to 100° C., initial thermal conductivity in the thickness direction was set to 1.0 W (m·K), thermal conductivity after switching in the thickness direction was set to 0.10 W (m·K), initial thermal conductivity in the plane direction was set to 1.0 W (m·K), thermal conductivity after switching in the plane direction was set to 3000 W (m·K), and a temperature in each cell 200, a surface average temperature of the partition member 1, and thermal resistance per unit area of the partition member 1 were estimated.

Figure 9A:
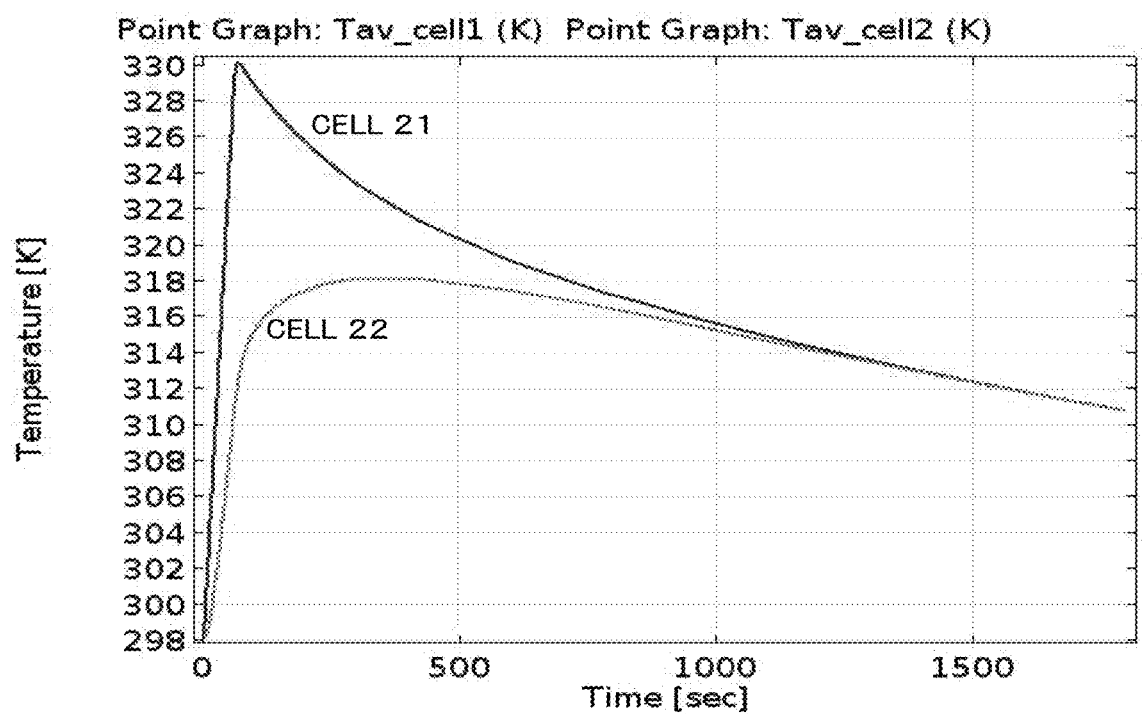
FIG. 9A is a graph showing a temperature variation inside a cell in example 1-1.

FIG. 9A is a graph showing a temperature variation inside a cell in example 1-1. An ordinate represents an absolute temperature [K] inside a cell 2 and an abscissa represents time [seconds] after a localized high-temperature portion is generated inside the cell 21. Although temperatures inside the cell 21 and the cell 22 gradually rise after a localized high-temperature portion is generated inside the cell 21, both temperatures converge before reaching 350 K or higher and both the cell 21 and the cell 22 have not reached a state of abnormal heat generation. In other words, a possibility is shown that, by preventing the cell 21 from reaching a state of abnormal heat generation, a situation where the cell 22 receives heat from the cell 21 and reaches a state of abnormal heat generation can also be prevented.

Figure 9B:
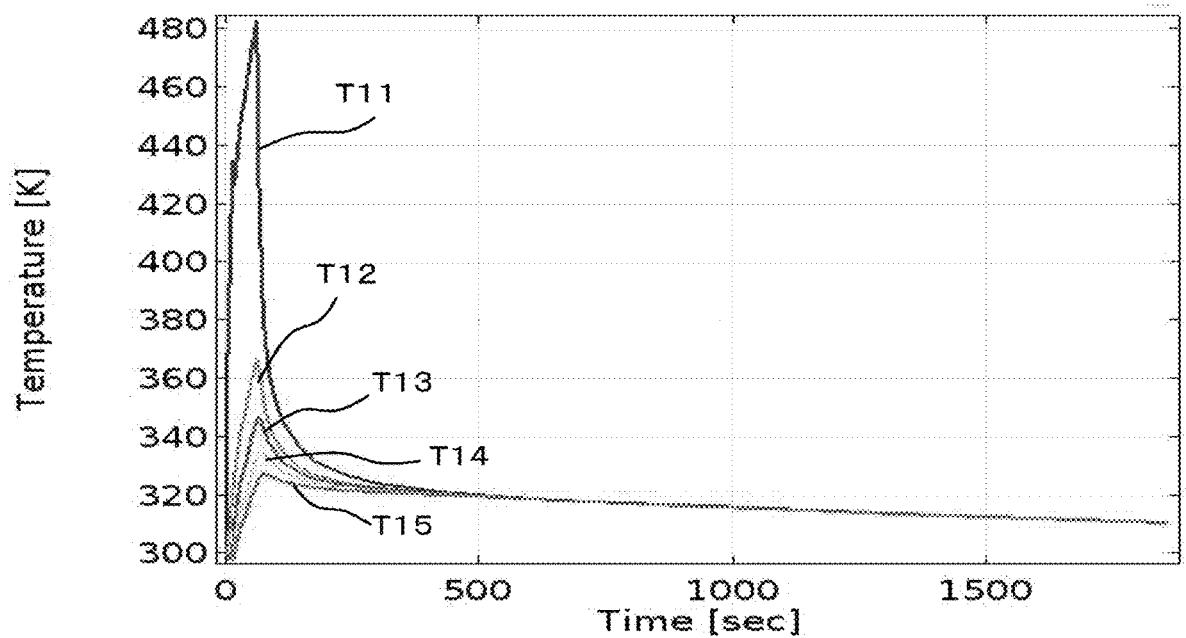
FIG. 9B is a graph showing a transition in a partition member-side surface temperature of a cell 21 in example 1-1.
Figure 9C:
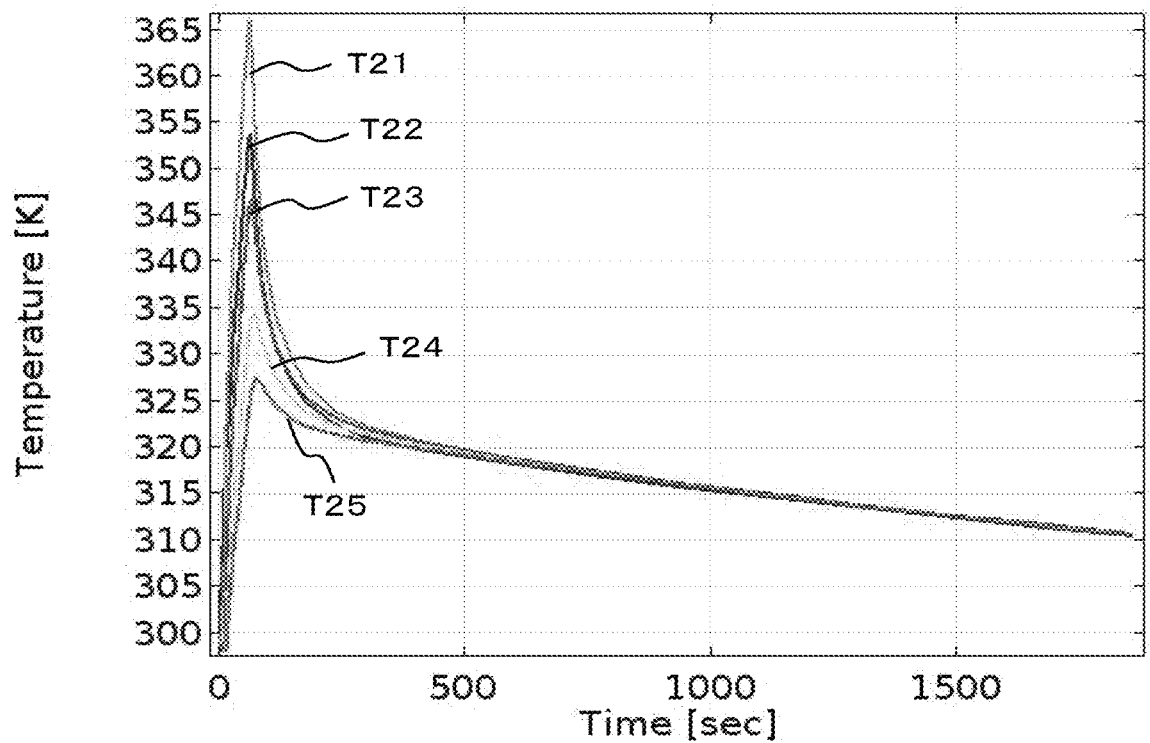
FIG. 9C is a graph showing a transition in a partition member-side surface temperature of a cell 22 in example 1-1.

FIG. 9B is a graph showing a transition in a partition member-side surface temperature of the cell 21 in example 1-1. FIG. 9C is a graph showing a transition in a partition member-side surface temperature of the cell 22 in example 1-1. Ordinates in FIG. 9B and FIG. 9C represent a partition member-side surface temperature [K] of a cell 200 and abscissas represent time [seconds] after a localized high-temperature portion is generated inside the cell 21. The partition member-side surface temperatures of the cell 21 and the cell 22 are measured at a plurality of temperature measurement points distributed on a surface on the side of the partition member. The graph in FIG. 9B represents a transition in temperature at each of temperature measurement points T11 to T15 shown in FIG. 7A. The graph in FIG. 9C represents a transition in temperature at each of temperature measurement points T21 to T25 shown in FIG. 7A.

Figure 7B:
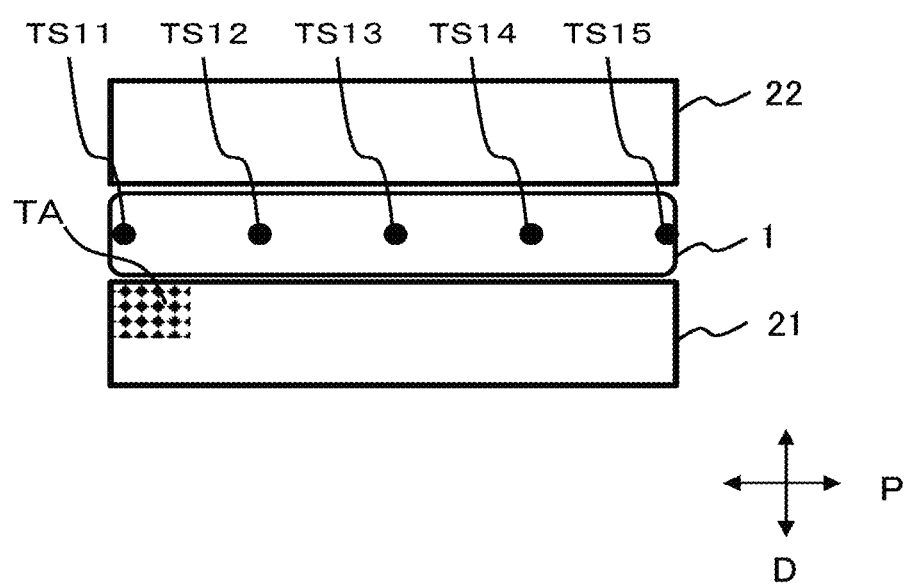
FIG. 7B illustrates a two-dimensional coordinate system simplified assembled battery model that is constituted by two cells.
Figure 9D:
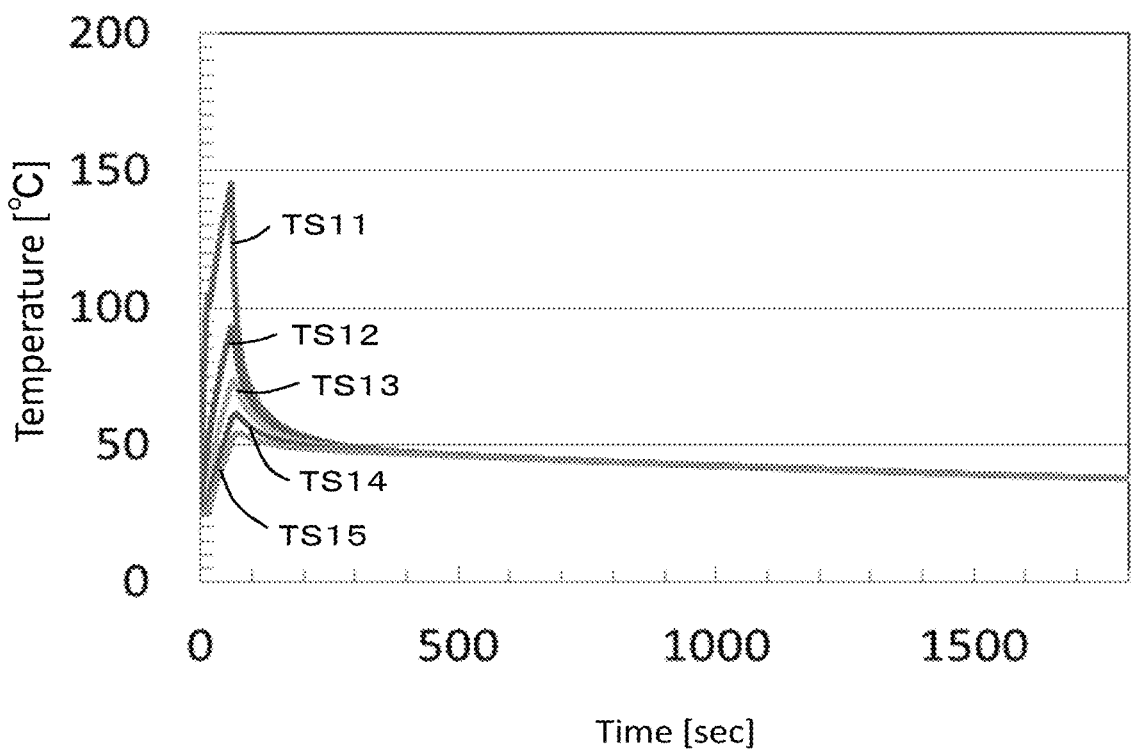
FIG. 9D is a graph showing a temperature transition inside a partition member in example 1-1.

In addition, FIG. 9D is a graph showing a temperature transition inside a partition member in example 1-1. The graph in FIG. 9D represents a transition in temperature at each of temperature measurement points TS11 to TS15 inside the partition member 1 shown in FIG. 7B. The temperature at each temperature measurement point inside the partition member 1 is obtained from a weighted average of temperatures of respective surface points of the cell 21 and the cell 22 shown in FIG. 9B and FIG. 9C. An ordinate represents a partition member internal temperature (° C.) and an abscissa represents time [seconds] after a localized high-temperature portion is generated inside the cell 21.

Figure 9E:
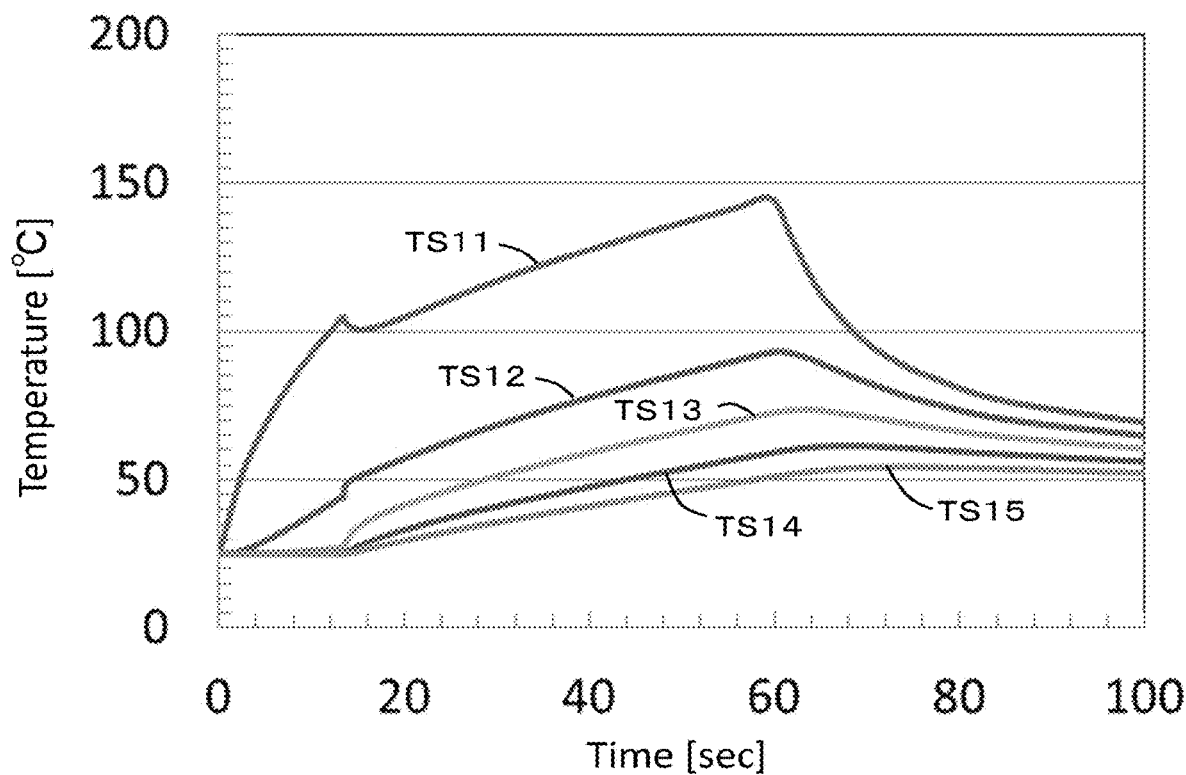
FIG. 9E is a graph created by enlarging a part of the graph shown in FIG. 9D with respect to a time axis.

FIG. 9E is a graph created by enlarging, with respect to a time axis, a portion from an occurrence of a localized high-temperature portion inside the cell 21 in FIG. 9D till 100 seconds after the occurrence. While the temperature of TS11 that is closest to the localized high-temperature portion inside the cell 21 inside the partition member rises to around 150° C. after approximately 60 seconds, the temperature of TS12 at that time point is around 90° C., the temperature of TS13 is around 70° C., the temperature of TS14 is around 60° C., and the temperature of TS15 is around 50° C., thereby indicating that heat transferred from the localized high-temperature portion inside the cell 21 to the partition member 1 is efficiently dispersed inside the partition member 1. In addition, it was estimated that the partition member internal temperature becomes more or less uniform at approximately 50° C. at around 300 seconds after the cell 21 enters a state of abnormal heat generation.

Table 1 shows setting values of physical properties of the partition member in example 1-1 and shows values [m²·K/W] of thermal resistance per unit area in the thickness direction and values [m²·K/W] of thermal resistance per unit area in the plane direction as calculated from the setting values. A thermal resistance initial value ($\theta_{d2}$) per unit area in the thickness direction was $2.0 \times 10^{-3}$ m²·K/W, a value ($\theta_{d1}$) after switching of the thermal resistance per unit area in the thickness direction was $2.0 \times 10^{-2}$ m²·K/W, a thermal resistance initial value ($\theta_{p2}$) per unit area in the plane direction was $7.4 \times 10^{-2}$ m²·K/W, and a value ($\theta_{p1}$) after switching of the thermal resistance per unit area in the plane direction was $2.5 \times 10^{-5}$ m²·K/W. It should be noted that a plane direction heat transfer distance used to calculate the thermal resistance values per unit area in the plane direction was set to $7.4 \times 10^{-2}$ m. From these values, it was calculated that $(\theta_{p1}/\theta_{p2})/(\theta_{d1}/\theta_{d2}) = 3.3 \times 10^{-5}$, and $\theta_{d1}/\theta_{p1} = 8.1 \times 10^{2}$.

In other words, the partition member 1 in example 1-1 satisfies conditions related to thermal resistance per unit area of Expression 1 and Expression 2 described above.

TABLE 1

| Condition | Unit | Example 1-1 | Comparative Example 1-1 | Comparative Example 1-2 |
|---|---|---|---|---|
| Partition member thickness | [mm] | 2.0 | 2.0 | 2.0 |
| Switching temperature | [° C.] | 100 | 100 | 100 |
| Plane direction thermal conductivity: initial value | [W/(m · K)] | 1.0 | 1.0 | 0.20 |
| Plane direction thermal conductivity: after switching | [W/(m · K)] | $3.0 \times 10^{3}$ | $3.0 \times 10^{2}$ | 0.20 |
| Thickness direction thermal conductivity: initial value | [W/(m · K)] | 1.0 | 1.0 | 0.20 |
| Thickness direction thermal conductivity: after switching | [W/(m · K)] | 0.10 | 0.10 | 0.20 |
| Thickness direction thermal resistance: initial value $\theta_{d2}$ | [m²K/W] | $2.0 \times 10^{-3}$ | $2.0 \times 10^{-3}$ | $1.0 \times 10^{-2}$ |
| Thickness direction thermal resistance: after switching $\theta_{d1}$ | [m²K/W] | $2.0 \times 10^{-2}$ | $2.0 \times 10^{-2}$ | $1.0 \times 10^{-2}$ |
| Plane direction thermal resistance: initial value $\theta_{p2}$ | [m²K/W] | $7.4 \times 10^{-2}$ | $7.4 \times 10^{-2}$ | $3.7 \times 10^{-1}$ |
| Plane direction thermal resistance: after switching $\theta_{p1}$ | [m²K/W] | $2.5 \times 10^{-5}$ | $2.5 \times 10^{-4}$ | $3.7 \times 10^{-1}$ |
| $(\theta_{p1}/\theta_{p2})/(\theta_{d1}/\theta_{d2})$ | [—] | $3.3 \times 10^{-5}$ | $3.3 \times 10^{-4}$ | 1.0 |
| Thickness direction/plane direction thermal resistance ratio: during abnormality $\theta_{d1}/\theta_{p1}$ | [—] | $8.1 \times 10^{2}$ | $8.1 \times 10$ | $2.7 \times 10^{-2}$ |

Comparative Example 1-1

In comparative example 1-1, the partition member 1 was assumed to be a sophisticated partition member having a switching function which, when an internal average temperature of a portion in contact with a localized high-temperature portion generated inside the cell 21 inside the partition member 1 reaches a prescribed temperature, thermal conductivity varies in both the thickness direction D and the plane direction P, a switching temperature of the partition member 1 was set to 100° C., initial thermal conductivity in the thickness direction was set to 1.0 W (m·K), thermal conductivity after switching in the thickness direction was set to 0.10 W (m·K), initial thermal conductivity in the plane direction was set to 1.0 W (m·K), and thermal conductivity after switching in the plane direction was set to 300 W (m·K). In addition, film thickness was set to 2.0 mm. Under these conditions, a temperature of each cell 200, an internal temperature of the partition member 1, and thermal resistance per unit area of the partition member 1 were estimated.

Figure 10A:
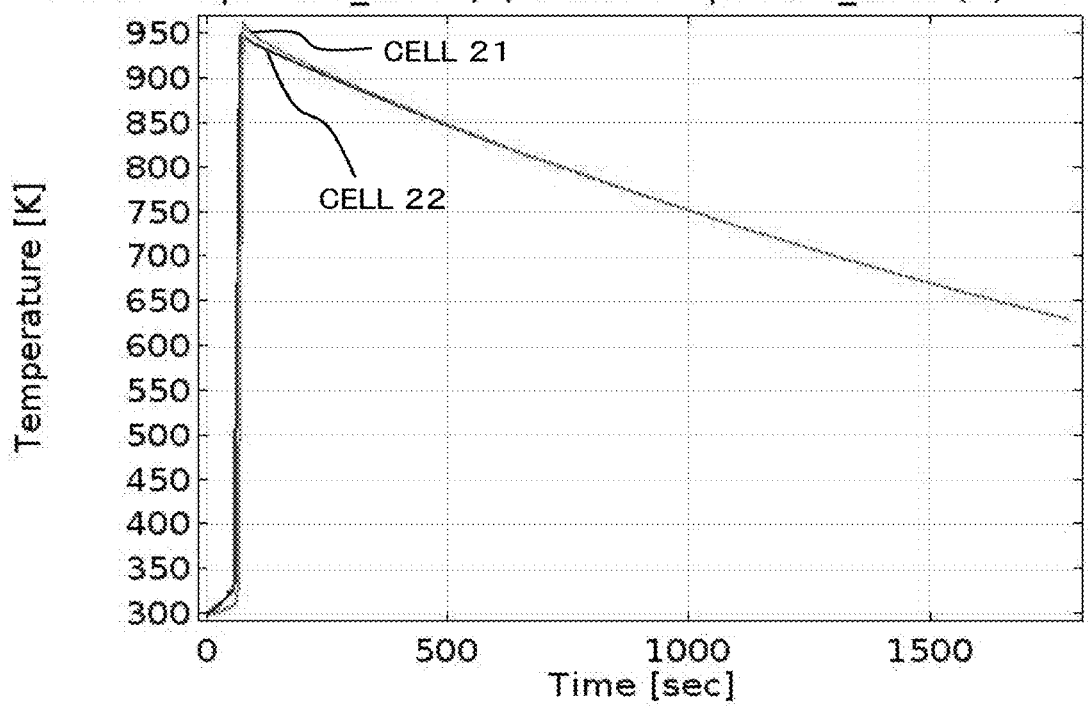
FIG. 10A is a graph showing a temperature variation inside a cell in comparative example 1-1.

FIG. 10A is a graph showing a temperature variation inside a cell in comparative example 1-1. An ordinate represents an absolute temperature [K] inside a cell 2 and an abscissa represents time [seconds] after a localized high-temperature portion is generated inside the cell 21. Approximately 50 seconds after the localized high-temperature portion is generated inside the cell 21, the temperature inside the cell 21 exceeds 500 K and the cell 21 reaches a state of abnormal heat generation and, at the same time, the cell 22 having received heat from the cell 21 having abnormally generated heat also reaches a state of abnormal heat generation, thereby suggesting that fire spread between the cells 2 occurs.

Figure 10B:
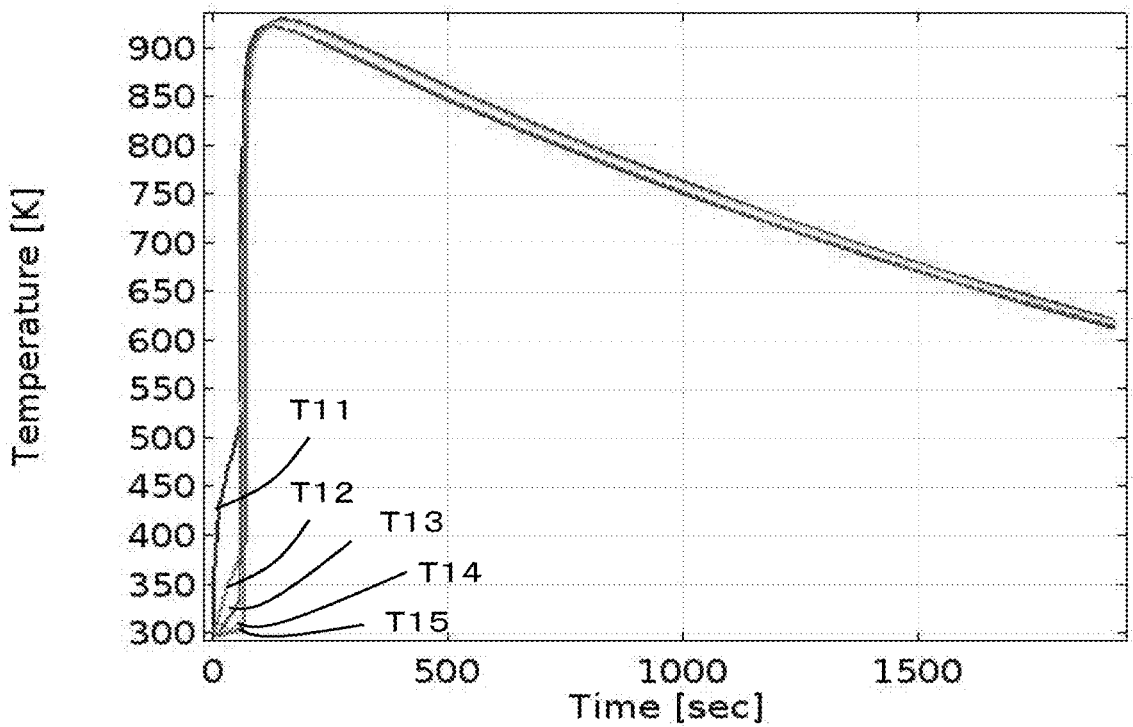
FIG. 10B is a graph showing a transition in a partition member-side surface temperature of the cell 21 in comparative example 1-1.
Figure 10C:
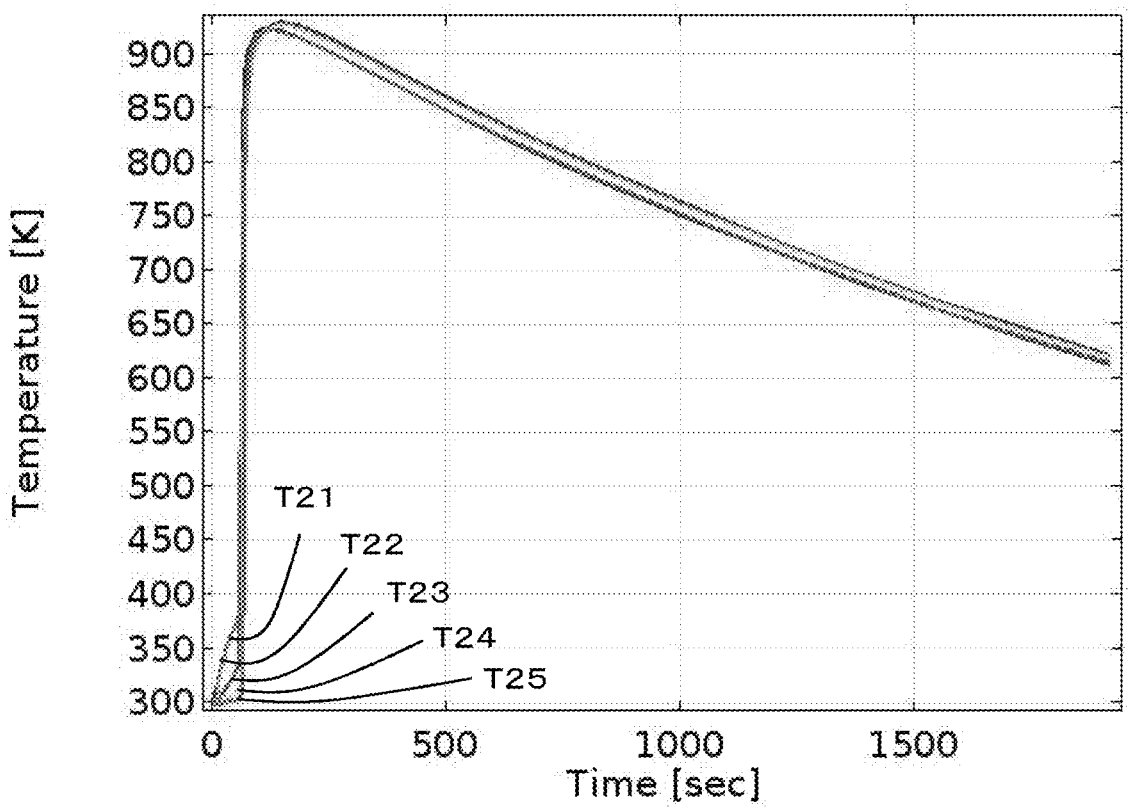
FIG. 10C is a graph showing a transition in a partition member-side surface temperature of the cell 22 in comparative example 1-1.

FIG. 10B is a graph showing a transition in a partition member-side surface temperature of the cell 21 in comparative example 1-1. FIG. 10C is a graph showing a transition in a partition member-side surface temperature of the cell 22 in comparative example 1-1. Ordinates in FIG. 10B and FIG. 10C represent a partition member-side surface temperature [K] of a cell 200 and abscissas represent time [seconds] after an abnormal heat generation portion is generated inside the cell 21. The graph in FIG. 10B represents a transition in temperature at each of the temperature measurement points T11 to T15 shown in FIG. 7A. The graph in FIG. 10C represents a transition in temperature at each of the temperature measurement points T21 to T25 shown in FIG. 7A.

Figure 10D:
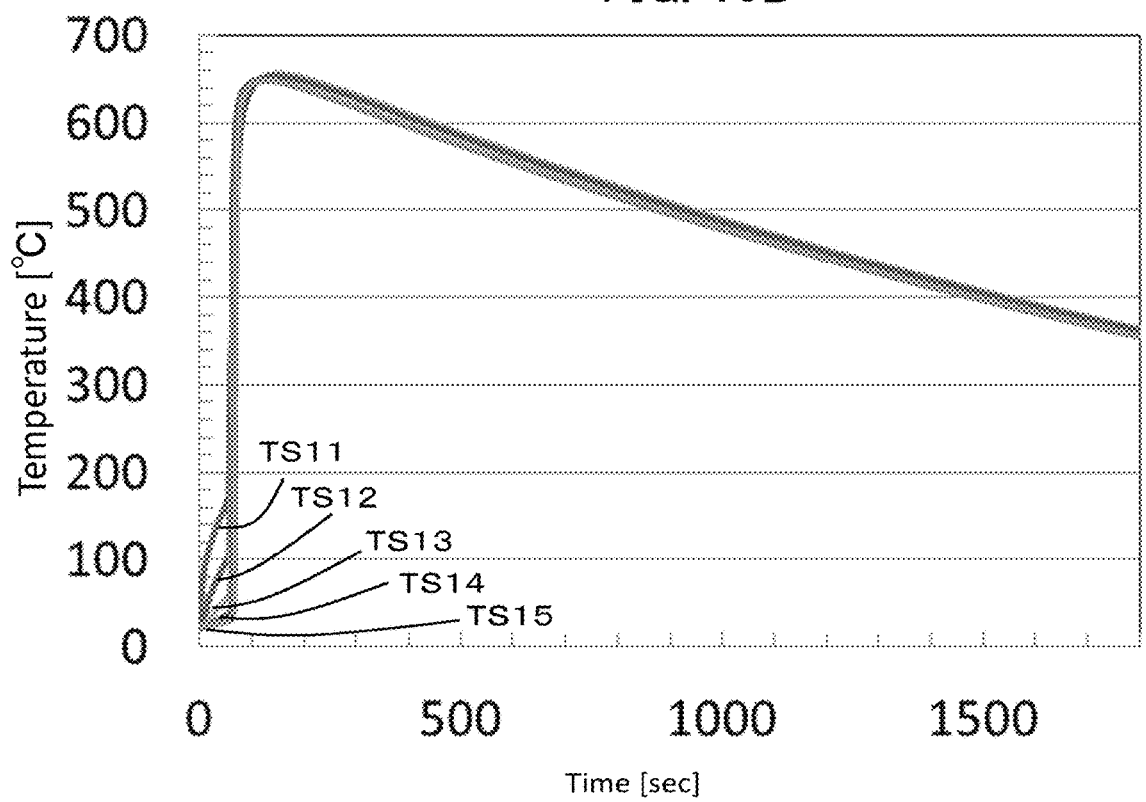
FIG. 10D is a graph showing a temperature transition inside a partition member in comparative example 1-1.

In addition, FIG. 10D is a graph showing a temperature transition inside a partition member in comparative example 1-1. The graph in FIG. 10D represents a transition in temperature at each of the temperature measurement points TS11 to TS15 inside the partition member 1 shown in FIG. 7B. The temperature at each temperature measurement point inside the partition member 1 is obtained from a weighted average of temperatures of respective surface points of the cell 21 and the cell 22 shown in FIG. 10B and FIG. 10C. An ordinate represents a partition member internal temperature (° C.) and an abscissa represents time [seconds] after a localized high-temperature portion is generated inside the cell 21.

Figure 10E:
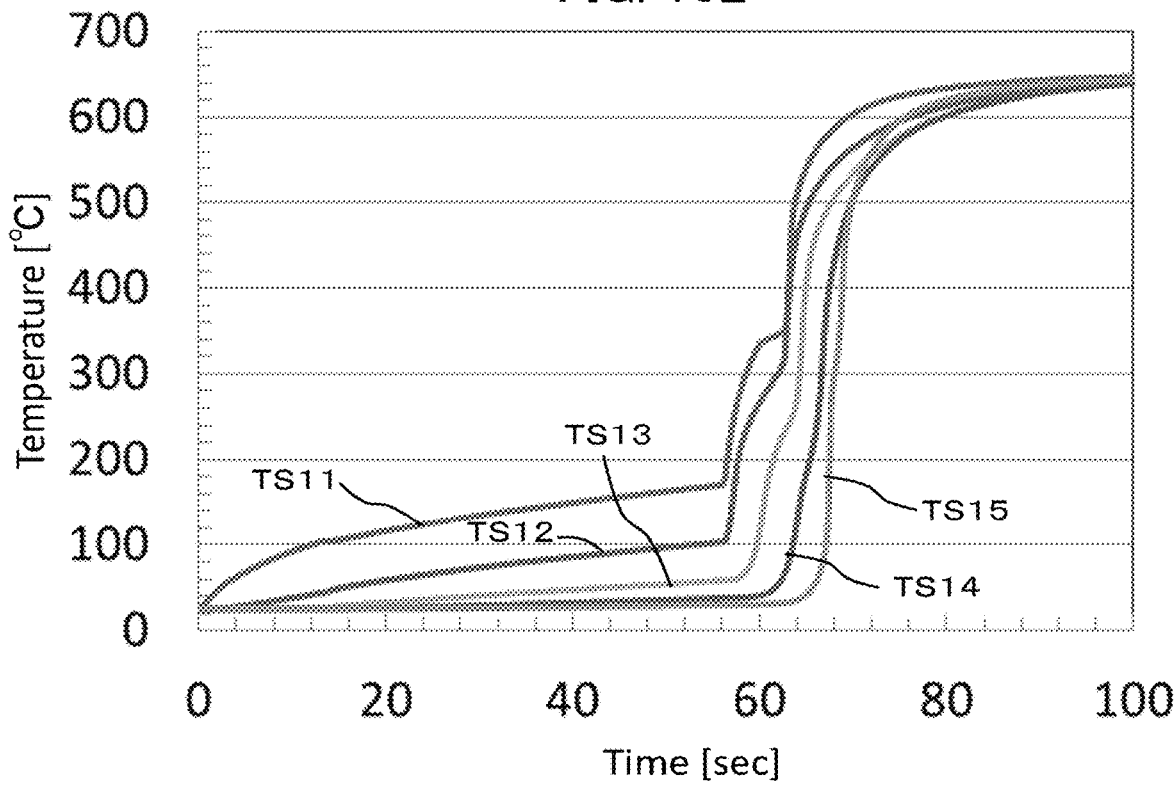
FIG. 10E is a graph created by enlarging a part of the graph shown in FIG. 10D with respect to a time axis.

FIG. 10E is a graph created by enlarging, with respect to a time axis, a portion from an occurrence of a localized high-temperature portion inside the cell 21 in FIG. 10D till 100 seconds after the occurrence. The temperature at each point inside the partition member is obtained from a weighted average of temperatures of respective surface points of the cell 21 and the cell 22. While the temperature of TS11 that is closest to the localized high-temperature portion inside the cell 21 inside the partition member rises to around 150° C. after approximately 40 seconds, the temperature of TS12 at that time point is around 90° C., the temperature of TS13 is around 50° C., the temperature of TS14 is around 30° C., and the temperature of TS15 is around 30° C., thereby indicating that a degree of dispersion of heat transferred from the localized high-temperature portion inside the cell 21 to the partition member 1 is low. In addition, it was estimated that, approximately 60 seconds after the localized high-temperature portion is generated inside the cell 21, the partition member internal temperature abruptly rises due to the cell 21 reaching a state of abnormal heat generation and the internal temperature becomes more or less uniform at approximately 650° C. at around 100 seconds thereafter.

Table 1 shows setting values of physical properties of the partition member in comparative example 1-1 and shows values [m²·K/W] of thermal resistance per unit area in the thickness direction and values [m²·K/W] of thermal resistance per unit area in the plane direction as calculated from the setting values. A thermal resistance initial value ($0_{d1}$ per unit area in the thickness direction was $2.0 \times 10^{-3}$ m²·K/W, a value ($\theta_{d1}$) after switching of the thermal resistance per unit area in the thickness direction was $2.0 \times 10^{-2}$ m²·K/W, a thermal resistance initial value ($\theta_{p2}$) per unit area in the plane direction was $7.4 \times 10^{-2}$ m²·K/W, and a value ($\theta_{p1}$) after switching of the thermal resistance per unit area in the plane direction was $2.5 \times 10^{-4}$ m²·K/W. It should be noted that a plane direction heat transfer distance used to calculate the thermal resistance values per unit area in the plane direction was set to $7.4 \times 10^{-2}$ m. From these values, it was calculated that $(\theta_{p1}/\theta_{p2})/(\theta_{d1}/\theta_{d2})=3.3\times10^{-4}$, and $\theta_{d1}/\theta_{p1}=8.1\times10^{1}$.

In other words, the partition member 1 in comparative example 1-1 satisfies neither of the conditions related to thermal resistance per unit area of Expression 1 and Expression 2 described above.

Comparative Example 1-2

In comparative example 1-2, the partition member 1 was assumed to be made of a general resin such as polypropylene (PP), with a film thickness set to 2 mm and thermal conductivity set to 0.20 W/m·K. Under these conditions, a temperature of each cell 200, an internal temperature of the partition member 1, and thermal resistance per unit area of the partition member 1 were estimated.

Figure 11A:
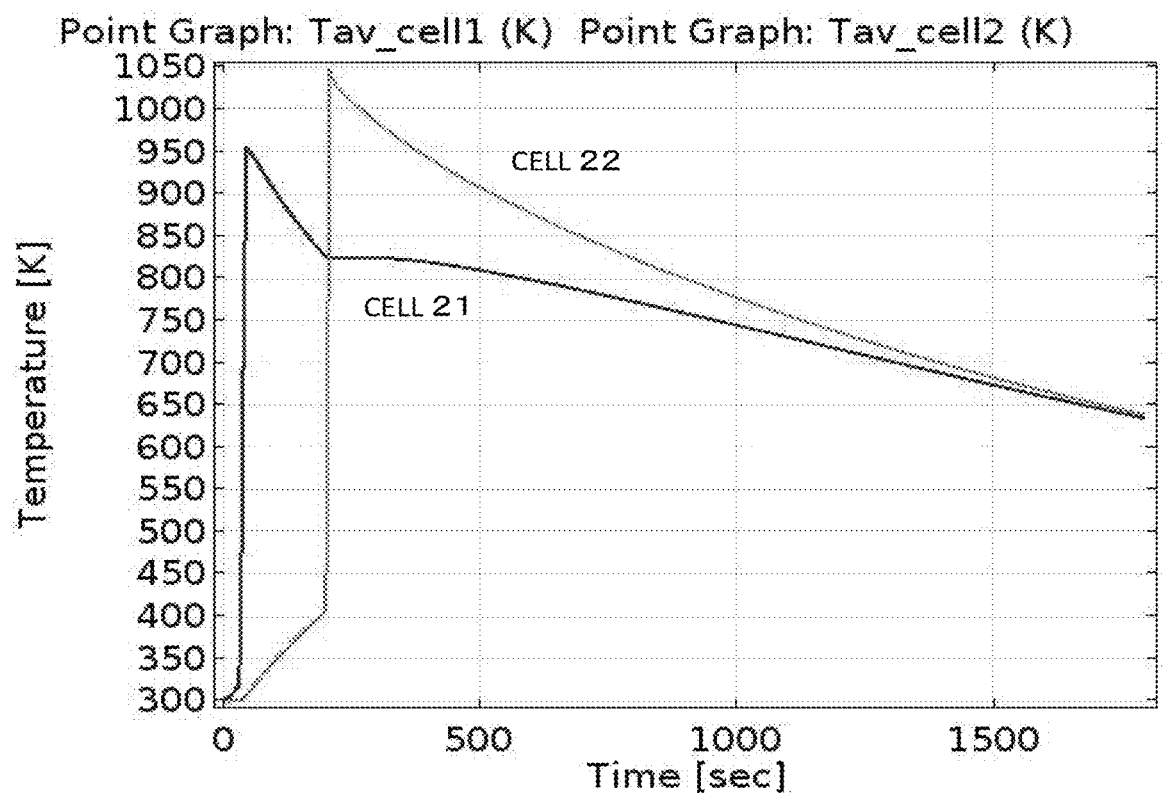
FIG. 11A is a graph showing a temperature variation inside a cell in comparative example 1-2.

FIG. 11A is a graph showing a temperature variation inside a cell in comparative example 1-2. An ordinate represents an absolute temperature [K] inside a cell 2 and an abscissa represents time [seconds] after a localized high-temperature portion is generated inside the cell 21. Approximately 200 seconds after a localized high-temperature portion is generated inside the cell 21, the temperature inside the cell 21 exceeds 500 K and the cell 21 reaches a state of abnormal heat generation and, at the same time, the cell 22 receiving heat from the cell 21 having abnormally generated heat also reaches a state of abnormal heat generation, thereby suggesting that fire spread between the cells 2 occurs.

Figure 11B:
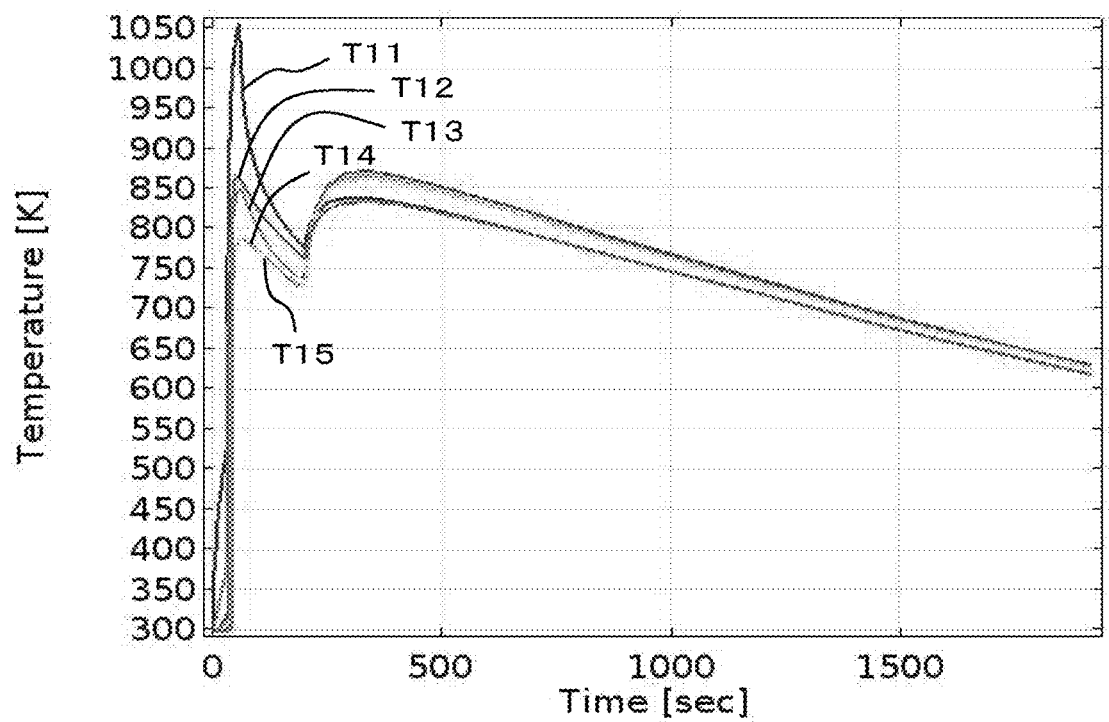
FIG. 11B is a graph showing a transition in a partition member-side surface temperature of the cell 21 in comparative example 1-2.
Figure 11C:
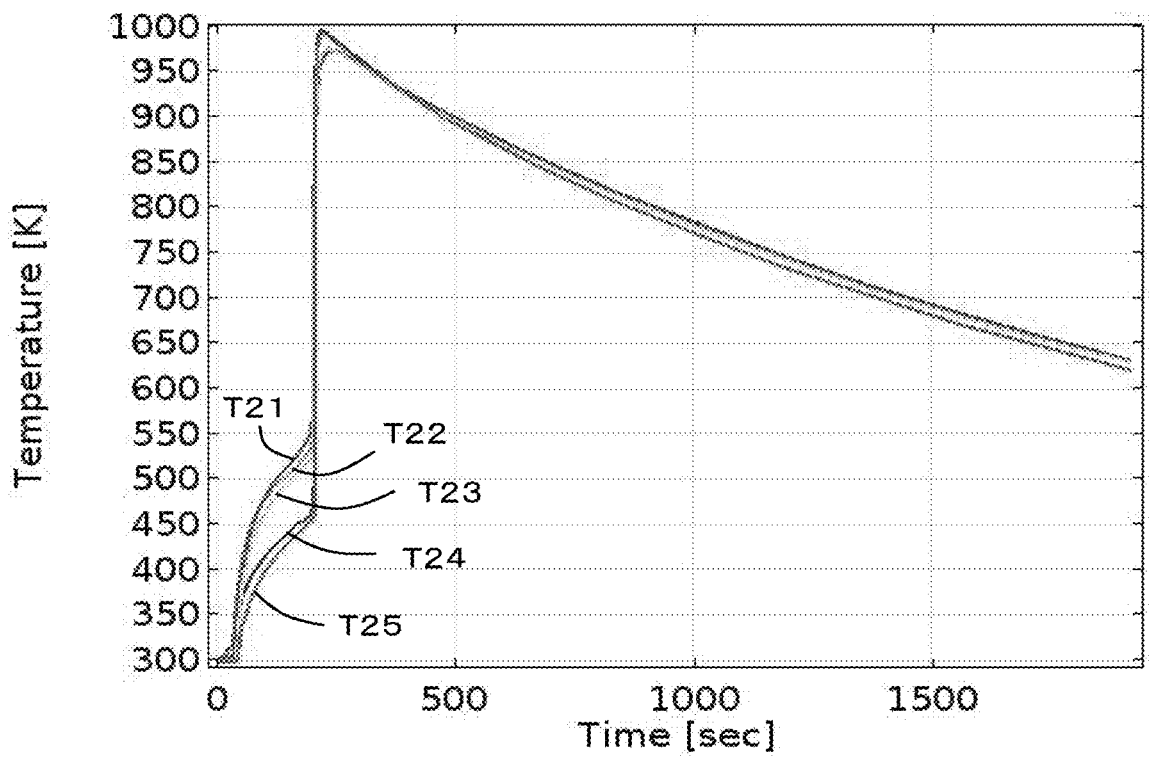
FIG. 11C is a graph showing a transition in a partition member-side surface temperature of the cell 22 in comparative example 1-2.

FIG. 11B is a graph showing a transition in a partition member-side surface temperature of the cell 21 in comparative example 1-2. FIG. 11C is a graph showing a transition in a partition member-side surface temperature of the cell 22 in comparative example 1-2. Ordinates in FIG. 11B and FIG. 11C represent a partition member-side surface temperature [K] of a cell 200 and abscissas represent time [seconds] after a localized high-temperature portion is generated inside the cell 21. The graph in FIG. 11B represents a transition in temperature at each of the temperature measurement points T11 to T15 shown in FIG. 7A. The graph in FIG. 11C represents a transition in temperature at each of the temperature measurement points T21 to T25 shown in FIG. 7A.

Figure 11D:
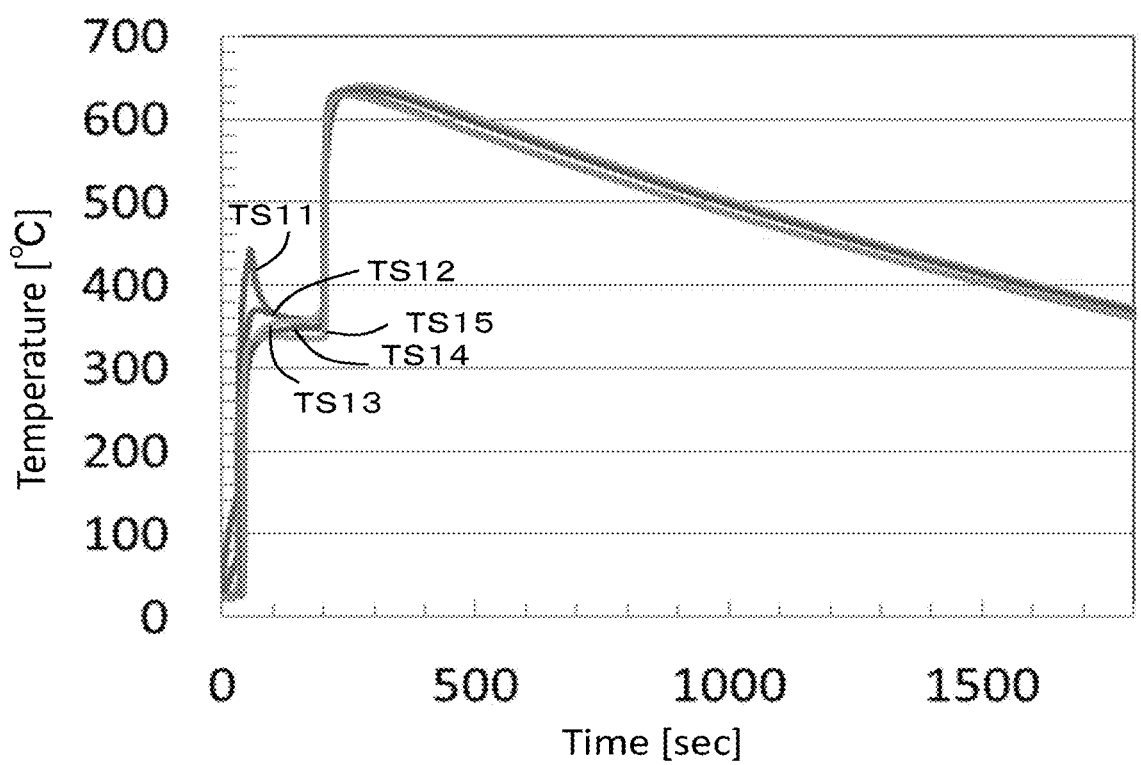
FIG. 11D is a graph showing a temperature transition inside a partition member in comparative example 1-2.

In addition, FIG. 11D is a graph showing a temperature transition inside a partition member in comparative example 1-2. The graph in FIG. 11D represents a transition in temperature at each of the temperature measurement points TS11 to TS15 inside the partition member 1 shown in FIG. 7B. The temperature at each temperature measurement point inside the partition member 1 is obtained from a weighted average of temperatures of respective surface points of the cell 21 and the cell 22 shown in FIG. 11B and FIG. 11C. An ordinate represents a partition member internal temperature (° C.) and an abscissa represents time [seconds] after a localized high-temperature portion is generated inside the cell 21.

Figure 11E:
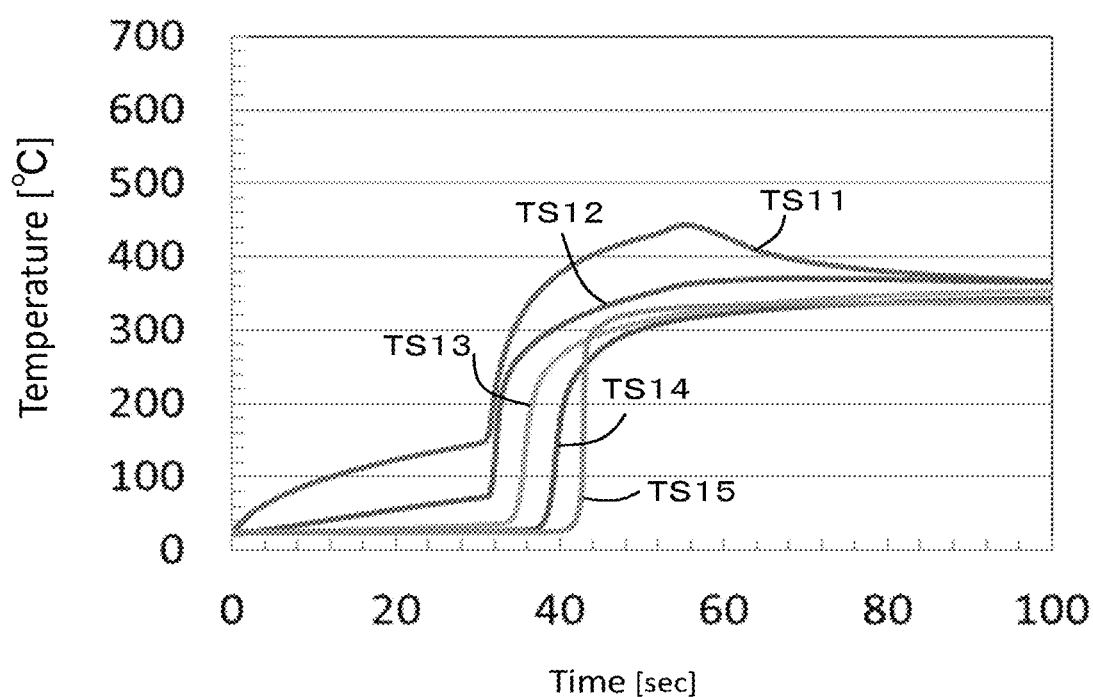
FIG. 11E is a graph created by enlarging a part of the graph shown in FIG. 11D with respect to a time axis.

FIG. 11E is a graph created by enlarging, with respect to a time axis, a portion from an occurrence of a localized high-temperature portion inside the cell 21 in FIG. 11D till 100 seconds after the occurrence. While the temperature of TS11 that is closest to the localized high-temperature portion inside the cell 21 inside the partition member rises to around 150° C. after approximately 30 seconds, the temperature of TS12 at that time point is around 70° C., the temperature of TS13 is around 35° C., the temperature of TS14 is around 30° C., and the temperature of TS15 is around 25° C., thereby indicating that a degree of dispersion of heat transferred from the localized high-temperature portion inside the cell 21 to the partition member 1 is low. In addition, it was estimated that, approximately 40 seconds after the localized high-temperature portion is generated inside the cell 21, the temperature inside the partition member 1 also abruptly rises due to the cell 21 reaching a state of abnormal heat generation and the internal temperature becomes more or less uniform at approximately 350° C. at around 100 seconds thereafter. Subsequently, it was estimated that the cell 22 reaches a state of abnormal heat generation due to heat transferred from the cell 21 having reached the state of abnormal heat generation and that the partition member internal temperature rises to around 650° C.

Table 1 shows setting values of physical properties of the partition member in comparative example 1-2 and shows values [m²·K/W] of thermal resistance per unit area in the thickness direction and values [m²·K/W] of thermal resistance per unit area in the plane direction as calculated from the setting values. A thermal resistance value ($\theta_{d2}=\theta_{d1}$) per unit area in the thickness direction was $1.0 \times 10^{-2}$ m²·K/W, and a thermal resistance initial value ($\theta_{p2}=\theta_{p1}$) per unit area in the plane direction was $3.7 \times 10^{-1}$ m²·K/W. It should be noted that a plane direction heat transfer distance used to calculate the thermal resistance values per unit area in the plane direction was set to $7.4 \times 10^{-2}$ m. From these values, it was calculated that $(\theta_{p1}/\theta_{p2})/(\theta_{d1}/\theta_{d2})=1.0$, and $\theta_{d1}/\theta_{p1}=2.7\times10^{-2}$.

In other words, the partition member 1 in comparative example 1-2 satisfies neither of the conditions related to thermal resistance per unit area of Expression 1 and Expression 2 described above.

<Second Case (Plane Direction Heat Control in Single Cell>

Example 2-1

In example 2-1, the partition member 1 was assumed to be a sophisticated partition member having a switching function which, when an average temperature of a portion sandwiched between the cell 21 where abnormal heat generation has occurred and the cell 22 opposing the cell 21 inside the partition member 1 reaches a prescribed temperature, thermal conductivity varies in both the thickness direction D and the plane direction P, and film thickness was set to 2.0 mm.

The partition member 1 having the switching function is, for example, a partition member which has the thickness direction D and the plane direction P that is perpendicular to the thickness direction D and which partitions between unit batteries or between a unit battery and a member other than the unit battery, the partition member being a structure designed to internally include a fluid with a boiling point at ordinary pressure of 80° C. or higher and 250° C. or lower and a flow path of the fluid which extends in the plane direction. Due to such a structure, a switching temperature of the partition member 1 was set to 100° C., initial thermal conductivity in the thickness direction was set to 1.0 W (m·K), thermal conductivity after switching in the thickness direction was set to 0.20 W (m·K), initial thermal conductivity in the plane direction was set to 1.0 W (m·K), thermal conductivity after switching in the plane direction was set to 3000 W (m·K), and a temperature in each cell 200, a surface average temperature of the partition member 1, and thermal resistance per unit area of the partition member 1 were estimated.

Figure 12A:
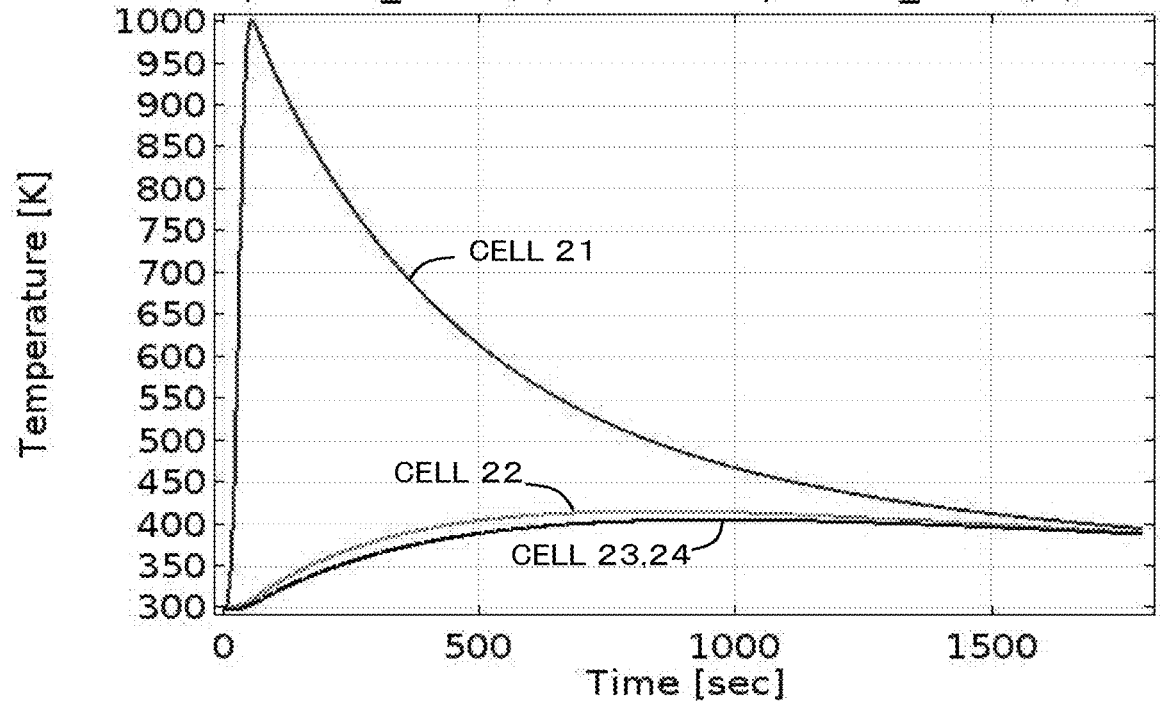
FIG. 12A is a graph showing a temperature variation inside a cell in example 2-1.

FIG. 12A is a graph showing a temperature variation inside a cell in example 2-1. An ordinate represents an absolute temperature [K] inside a cell 200 and an abscissa represents time [seconds] after the cell 21 reaches a state of abnormal heat generation. Although temperatures inside the cells 22, 23, and 24 gradually rise after the cell 21 reaches a state of abnormal heat generation, the internal temperatures converge to around 400 K without reaching a state of abnormal heat generation, thereby indicating a possibility that fire spread between the cells 2 can be suppressed.

Figure 12B:
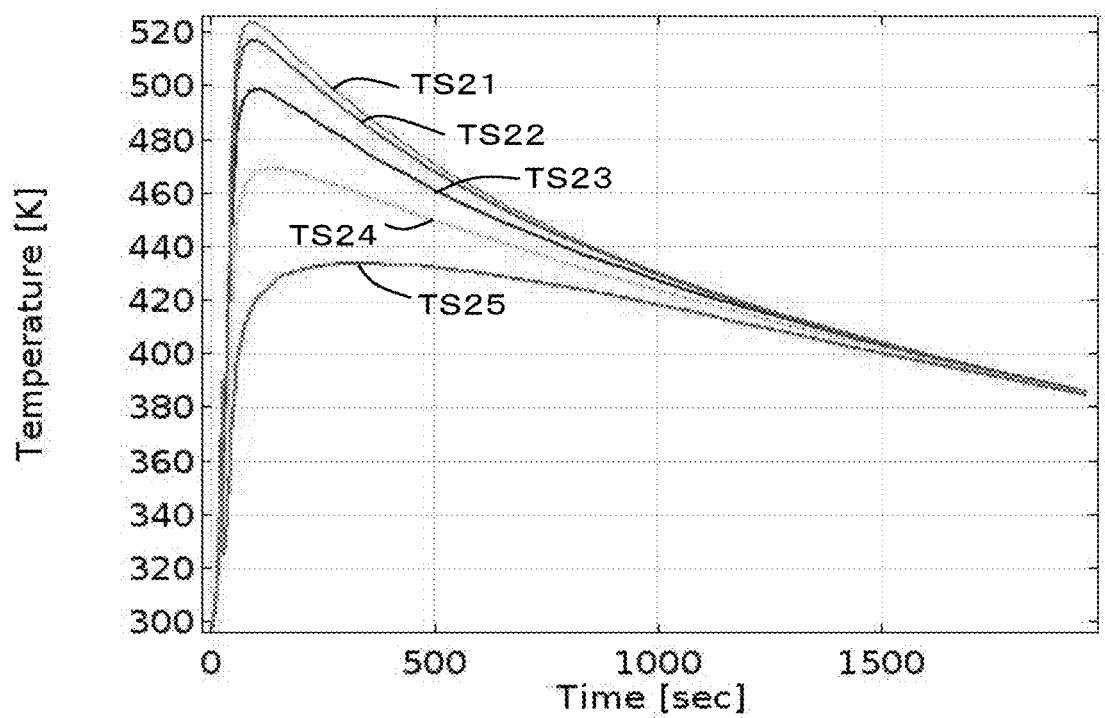
FIG. 12B is a graph showing a temperature transition inside a portion sandwiched between the cell 21 and the cell 22 among a partition member in example 2-1.
Figure 12C:
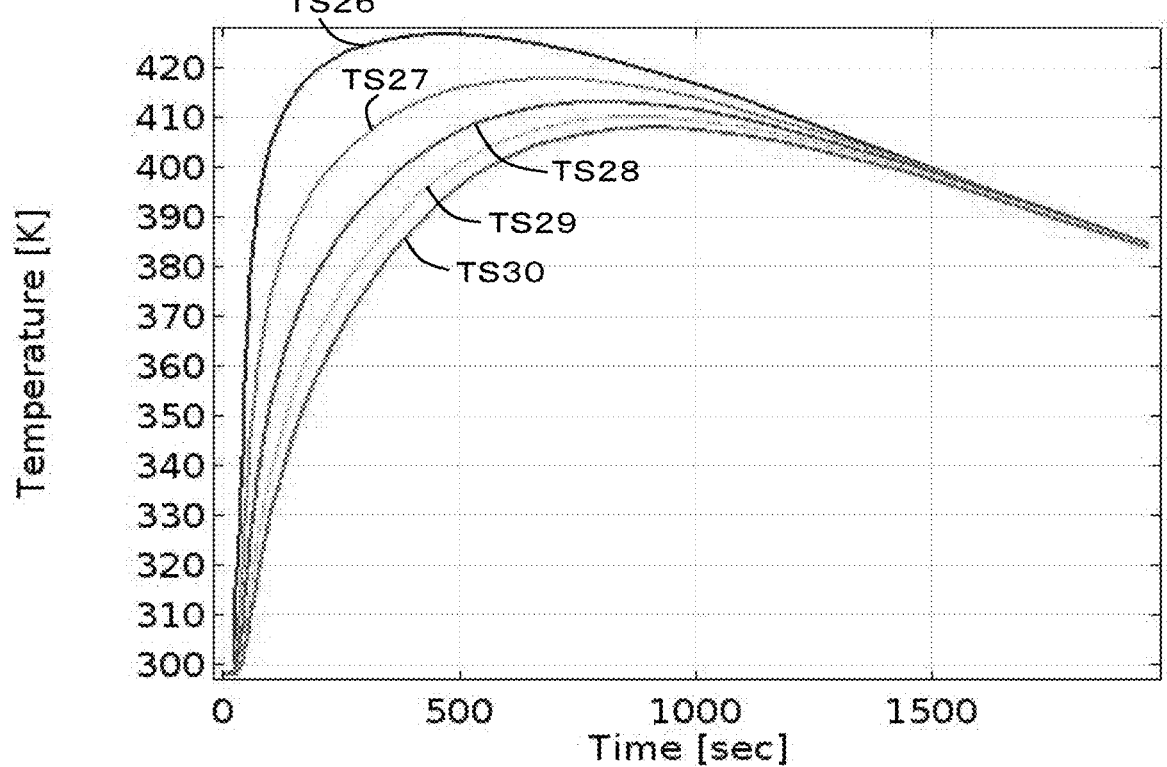
FIG. 12C is a graph showing a temperature transition inside a portion sandwiched between a cell 23 and a cell 24 among a partition member in example 2-1.

FIG. 12B is a graph showing a temperature transition inside a portion sandwiched between the cell 21 and the cell 22 among a partition member in example 2-1. The graph in FIG. 12B represents a transition in temperature at each of temperature measurement points TS21 to TS25 inside a portion sandwiched between the cell 21 and the cell 22 among the partition member 1 shown in FIG. 8. FIG. 12C is a graph showing a temperature transition inside a portion sandwiched between the cell 23 and the cell 24 among a partition member in example 2-1. The graph in FIG. 12C represents a transition in temperature at each of temperature measurement points TS26 to TS30 inside a portion sandwiched between the cell 23 and the cell 24 among the partition member 1 shown in FIG. 8. Ordinates in FIG. 12B and FIG. 12C represent an internal temperature (K) of the partition member 1 and abscissas represent time [seconds] after an abnormal heat generation portion is generated inside the cell 21.

Figure 12D:
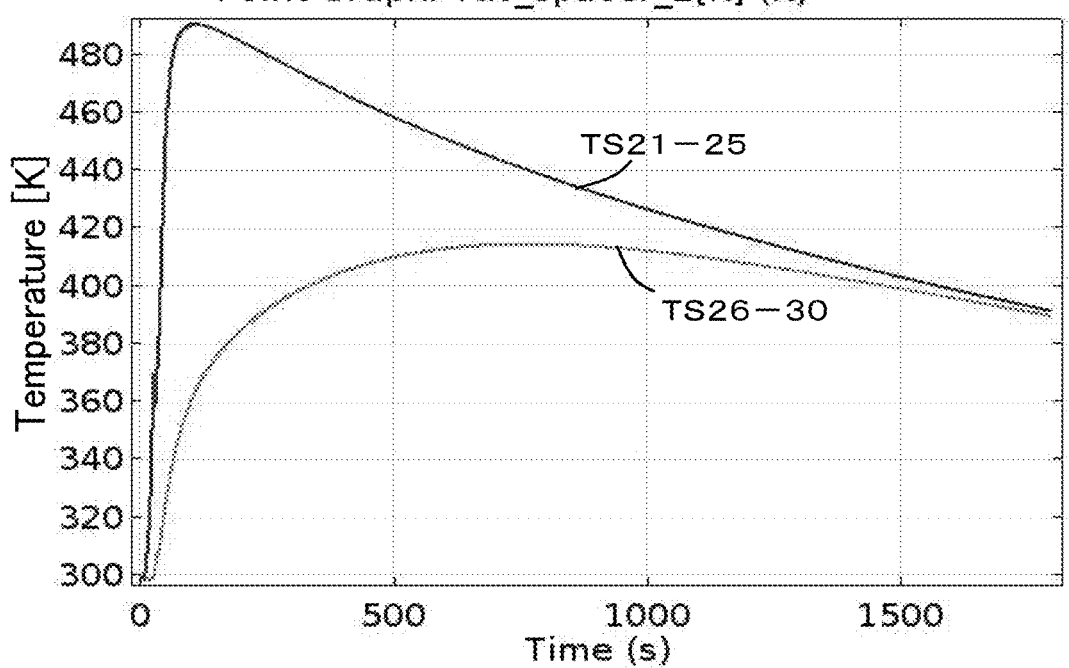
FIG. 12D is a graph showing transitions in an average temperature of an internal temperature of the partition member shown in FIG. 12B and an average temperature of an internal temperature of the partition member shown in FIG. 12C.

In addition, FIG. 12D is a graph showing a transition of average temperatures TS21 to TS25 of the portion sandwiched between the cell 21 and the cell 22 and a transition of average temperatures TS26 to TS30 of the portion sandwiched between the cell 23 and the cell 24 among the partition member 1 in example 2-1. Each temperature is obtained from a weighted average of temperatures of respective points shown in FIG. 12B and FIG. 12C. An ordinate represents a partition member internal temperature (K) and an abscissa represents time [seconds] after the cell 21 reaches a state of abnormal heat generation. While the average temperature of the portion sandwiched between the cell 21 and the cell 22 inside the partition member starts to rise immediately after the cell 21 reaches a state of abnormal heat generation to around 500 K, at that time point, the average temperature of the portion sandwiched between the cell 23 and the cell 24 reaches around 360 K. Subsequently, while the average temperature of the portion sandwiched between the cell 21 and the cell 22 inside the partition member gradually drops, the average temperature of the portion sandwiched between the cell 23 and the cell 24 continues to rise and, after reaching around 420 K, gradually drops. In other words, it is shown that heat transferred from the cell 21 at which abnormal heat generation had occurred is efficiently dispersed to the cell 22, the cell 23, and the cell 24 inside the partition member 1 and, accordingly, none of the cell 22, the cell 23, and the cell 24 reaches a state of abnormal heat generation.

Table 2 shows setting values of physical properties of the partition member in example 2-1 and shows values [$m^2 \cdot K/W$] of thermal resistance per unit area in the thickness direction and values [$m^2 \cdot K/W$] of thermal resistance per unit area in the plane direction as calculated from the setting values. A thermal resistance initial value ($\theta_{d2}$) per unit area in the thickness direction was $2.0 \times 10^{-3}$ $m^2 \cdot K/W$, a value ($\theta_{d1}$) after switching of the thermal resistance per unit area in the thickness direction was $1.0 \times 10^{-2}$ $m^2 \cdot K/W$, a thermal resistance initial value ($\theta_{p2}$) per unit area in the plane direction was $7.4 \times 10^{-2}$ $m^2 \cdot K/W$, and a value ($\theta_{p1}$) after switching of the thermal resistance per unit area in the plane direction was $2.5 \times 10^{-5}$ $m^2 \cdot K/W$. It should be noted that a plane direction heat transfer distance used to calculate the thermal resistance values per unit area in the plane direction was set to $7.4 \times 10^{-2}$ m. From these values, it was calculated that $$(\theta_{p1}/\theta_{p2})/(\theta_{d1}/\theta_{d2})=6.7\times10^{-5}, \text{ and}$$

$$\theta_{d1}/\theta_{p1}=4.1\times10^{2}.$$

In other words, the partition member 1 in example 2-1 satisfies conditions related to thermal resistance per unit area of Expression 1 and Expression 2 described above.

TABLE 2

| Condition | Unit | Example 2-1 | Comparative Example 2-1 | Comparative Example 2-2 |
| --- | --- | --- | --- | --- |
| Partition member thickness | [mm] | 2.0 | 2.0 | 2.0 |
| Switching temperature | [° C.] | 100 | 100 | 100 |
| Plane direction thermal conductivity: initial value | [W/(m · K)] | 1.0 | 1.0 | 0.20 |
| Plane direction thermal conductivity: after switching | [W/(m · K)] | $3.0 \times 10^3$ | $3.0 \times 10^2$ | 0.20 |
| Thickness direction thermal conductivity: initial value | [W/(m · K)] | 1.00 | 1.00 | 0.20 |
| Thickness direction thermal conductivity: after switching | [W/(m · K)] | 0.20 | 0.20 | 0.20 |
| Thickness direction thermal resistance: initial value $\theta_{d2}$ | [$m^2$K/W] | $2.0 \times 10^{-3}$ | $2.0 \times 10^{-3}$ | $1.0 \times 10^{-2}$ |
| Thickness direction thermal resistance: after switching $\theta_{d1}$ | [$m^2$K/W] | $1.0 \times 10^{-2}$ | $1.0 \times 10^{-2}$ | $1.0 \times 10^{-2}$ |
| Plane direction thermal resistance: initial value $\theta_{p2}$ | [$m^2$K/W] | $7.4 \times 10^{-2}$ | $7.4 \times 10^{-2}$ | $3.7 \times 10^{-1}$ |
| Plane direction thermal resistance: after switching $\theta_{p1}$ | [$m^2$K/W] | $2.5 \times 10^{-5}$ | $2.5 \times 10^{-4}$ | $3.7 \times 10^{-1}$ |

TABLE 2-continued

| Condition | Unit | Example 2-1 | Comparative Example 2-1 | Comparative Example 2-2 |
|---|---|---|---|---|
| $(\theta_{p1}/\theta_{p2})/(\theta_{d1}/\theta_{d2})$ | [—] | $6.7 \times 10^{-5}$ | $6.7 \times 10^{-4}$ | 1.0 |
| Thickness direction/plane direction thermal resistance ratio: during abnormality | [—] | $4.1 \times 10^2$ | $4.1 \times 10$ | $2.7 \times 10^{-2}$ |
| $\theta_{d1}/\theta_{p1}$ | | | | |

Comparative Example 2-1

In comparative example 2-1, for example, the partition member 1 can be a partition member which has a thickness direction and a plane direction that is perpendicular to the thickness direction and which partitions between unit batteries or between a unit battery and a member other than the unit battery in the thickness direction, the partition member being a structure designed to internally include a fluid with a boiling point at ordinary pressure of 80° C. or higher and 250° C. and a flow path of the fluid which extends in the plane direction. Due to such a structure, a switching temperature of the partition member 1 was set to 100° C., initial thermal conductivity in the thickness direction was set to 1.0 W (m·K), thermal conductivity after switching in the thickness direction was set to 0.20 W (m·K), initial thermal conductivity in the plane direction was set to 1.0 W (m·K), and thermal conductivity after switching in the plane direction was set to 300 W (m·K). In addition, film thickness was set to 2.0 mm. Under these conditions, a temperature of each cell 200, an internal temperature of the partition member 1, and thermal resistance per unit area of the partition member 1 were estimated.

Figure 13A:
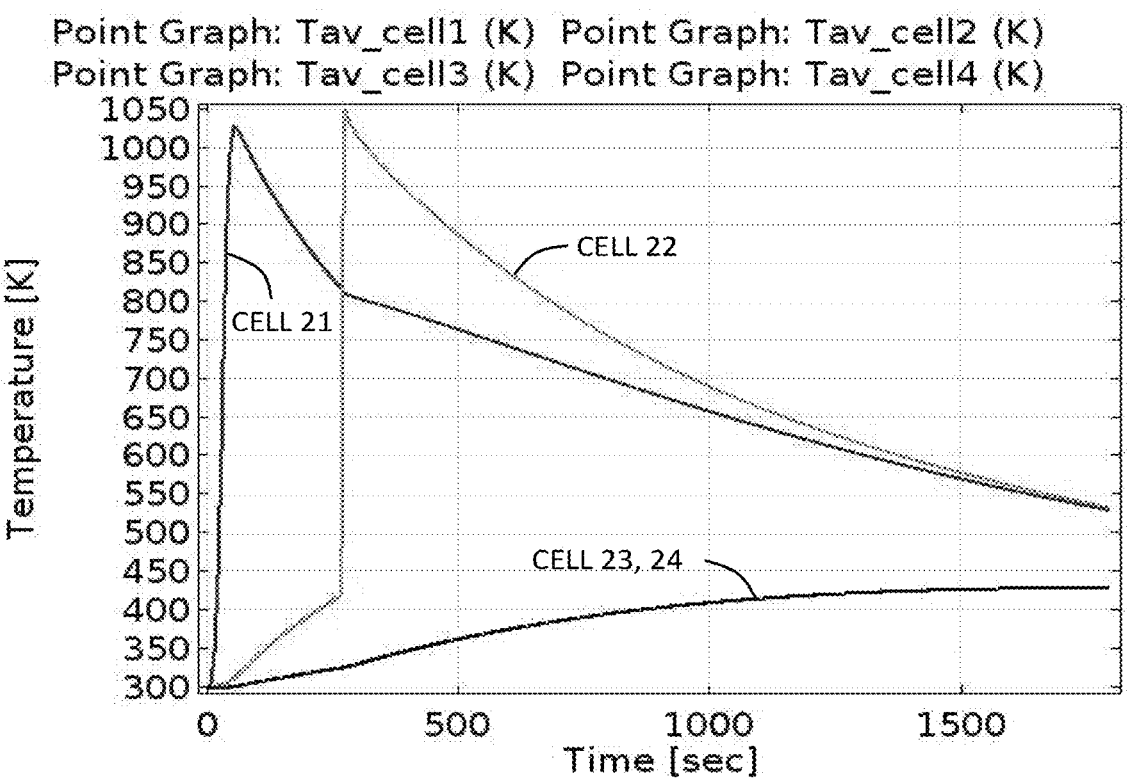
FIG. 13A is a graph showing a temperature variation inside a cell in comparative example 2-1.

FIG. 13A is a graph showing a temperature variation inside a cell in comparative example 2-1. An ordinate represents an absolute temperature [K] inside a cell 200 and an abscissa represents time [seconds] after the cell 21 reaches a state of abnormal heat generation. While temperatures inside the cells 22, 23, and 24 gradually rise after the cell 21 reaches a state of abnormal heat generation and the cells 23 and 24 rise to around 450 K but do not reach a state of abnormal heat generation, it is estimated that the cell 22 is to reach a state of abnormal heat generation after approximately 250 seconds, thereby indicating that fire spread between the cells 2 cannot be suppressed under the conditions of comparative example 2-1.

Figure 13B:
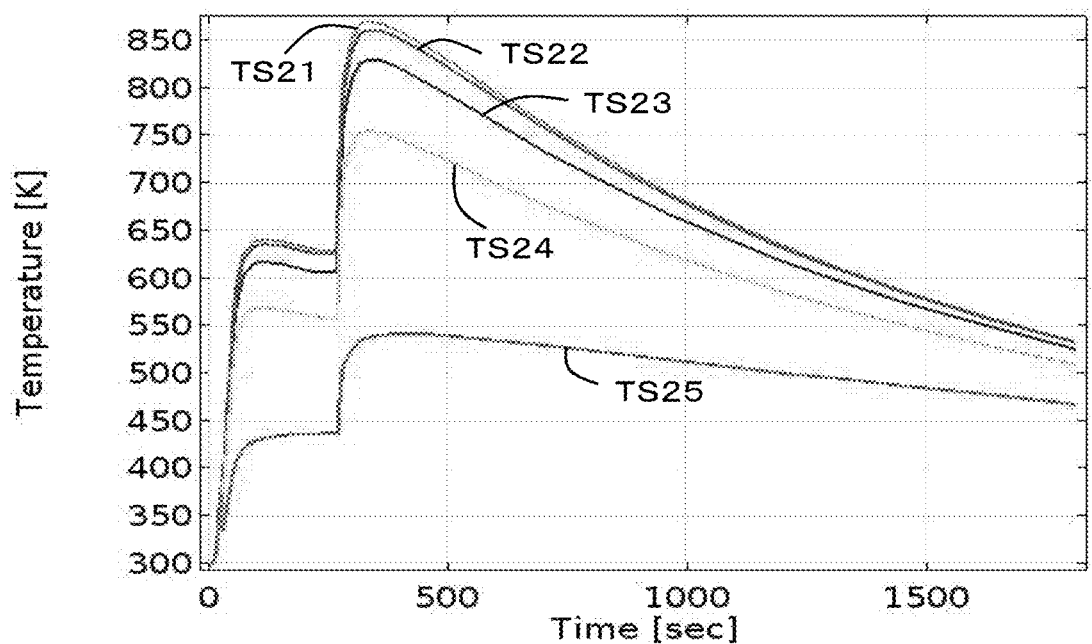
FIG. 13B is a graph showing a temperature transition inside a portion sandwiched between the cell 21 and the cell 22 among a partition member in comparative example 2-1.
Figure 13C:
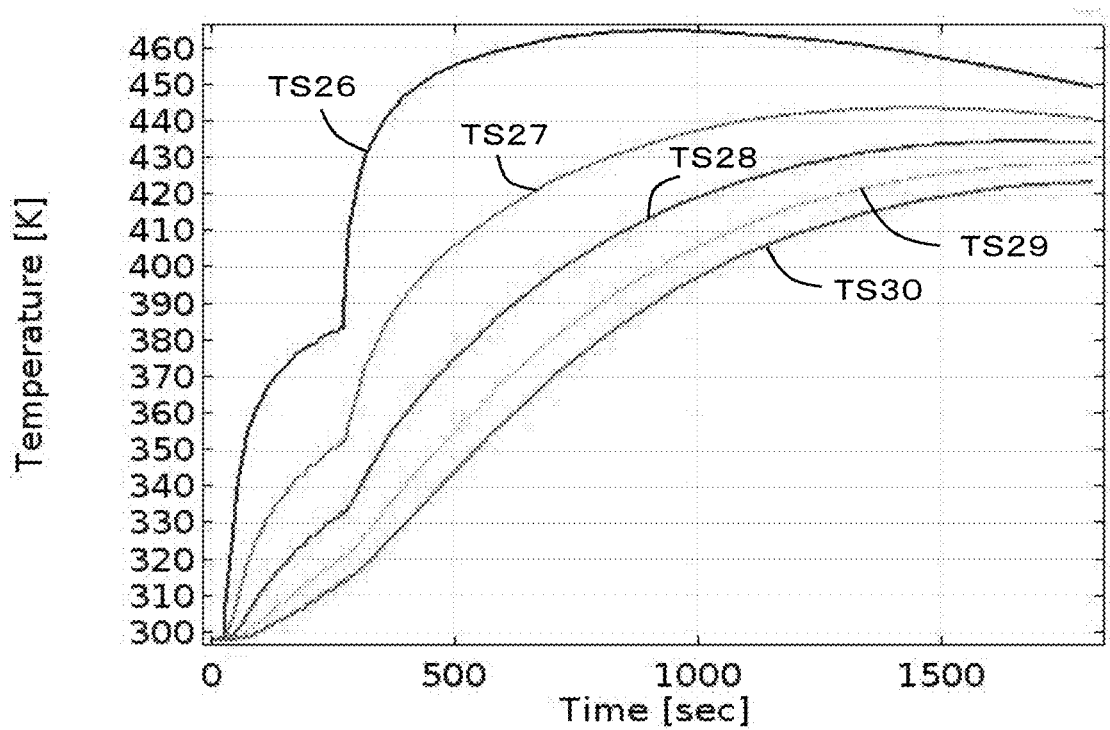
FIG. 13C is a graph showing a temperature transition inside a portion sandwiched between the cell 23 and the cell 24 among a partition member in comparative example 2-1.

FIG. 13B is a graph showing a temperature transition inside the portion sandwiched between the cell 21 and the cell 22 among the partition member in comparative example 2-1. The graph in FIG. 13B represents a transition in temperature at each of the temperature measurement points TS21 to TS25 inside the portion sandwiched between the cell 21 and the cell 22 among the partition member 1 shown in FIG. 8. FIG. 13C is a graph showing a temperature transition inside the portion sandwiched between the cell 23 and the cell 24 among the partition member in comparative example 2-1. The graph in FIG. 13C represents a transition in temperature at each of the temperature measurement points TS26 to TS30 inside the portion sandwiched between the cell 23 and the cell 24 among the partition member 1 shown in FIG. 8. Ordinates in FIG. 13B and FIG. 13C represent an internal temperature (K) of the partition member and abscissas represent time [seconds] after an abnormal heat generation portion is generated inside the cell 21.

Figure 13D:
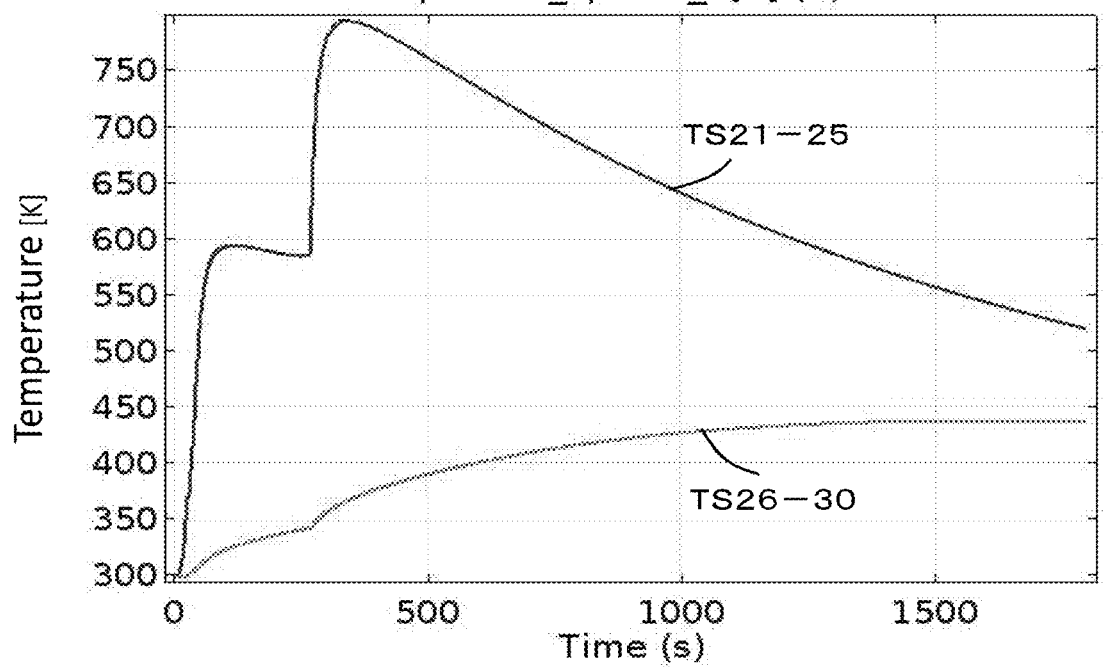
FIG. 13D is a graph showing transitions in an average temperature of an internal temperature of the partition member shown in FIG. 13B and an average temperature of an internal temperature of the partition member shown in FIG. 13C.

In addition, FIG. 13D is a graph showing a transition of average temperatures TS21 to TS25 of the portion sandwiched between the cell 21 and the cell 22 and a transition of average temperatures TS26 to TS30 of the portion sandwiched between the cell 23 and the cell 24 among the partition member 1 in comparative example 2-1. Each temperature is obtained from a weighted average of temperatures of respective points shown in FIG. 13B and FIG. 13C. An ordinate represents a partition member internal temperature (K) and an abscissa represents time [seconds] after the cell 21 reaches a state of abnormal heat generation. While the average temperature of the portion sandwiched between the cell 21 and the cell 22 inside the partition member starts to rise immediately after the cell 21 reaches a state of abnormal heat generation to around 600 K, at that time point, the average temperature of the portion sandwiched between the cell 23 and the cell 24 is below 330 K. In other words, it is shown that a degree of dispersion of heat transferred from the cell 21 at which abnormal heat generation had occurred to the cell 22, the cell 23, and the cell 24 inside the partition member 1 is not appropriate. Subsequently, while the average temperature of the portion sandwiched between the cell 21 and the cell 22 inside the partition member gradually drops, based on the fact that the cell 22 reaches a state of abnormal heat generation due to heat transferred from the cell 21 having reached a state of abnormal heat generation, it is expected that the average temperature of the portion sandwiched between the cell 21 and the cell 22 is to rise once again and reach around 800 K.

Table 2 shows setting values of physical properties of the partition member in comparative example 2-1 and shows values [$m^2$·K/W] of thermal resistance per unit area in the thickness direction and values [$m^2$·K/W] of thermal resistance per unit area in the plane direction as calculated from the setting values. A thermal resistance initial value ($\theta_{d2}$) per unit area in the thickness direction was $2.0 \times 10^{-3}$ $m^2$·K/W, a value ($\theta_{d1}$) after switching of the thermal resistance per unit area in the thickness direction was $1.0 \times 10^{-2}$ $m^2$·K/W, a thermal resistance initial value ($\theta_{p2}$) per unit area in the plane direction was $7.4 \times 10^{-2}$ $m^2$·K/W, and a value ($\theta_{p1}$) after switching of the thermal resistance per unit area in the plane direction was $2.5 \times 10^{-4}$ $m^2$·K/W. It should be noted that a plane direction heat transfer distance used to calculate the thermal resistance values per unit area in the plane direction was set to $7.4 \times 10^{-2}$ m. From these values, it was calculated that $(\theta_{p1}/\theta_{p2})/(\theta_{d1}/\theta_{d2})=6.7 \times 10^{-5}$, and $\theta_{d1}/\theta_{p1}=4.1 \times 10^2$.

In other words, the partition member 1 in comparative example 2-1 satisfies neither of the conditions related to thermal resistance per unit area of Expression 1 and Expression 3 described above.

Comparative Example 2-2

In comparative example 2-2, the partition member 1 was assumed to be made of a general resin such as polypropylene (PP), with a film thickness set to 2 mm and thermal conductivity set to 0.20 W/m·K. Under these conditions, a temperature of each cell 200, an internal temperature of the partition member 1, and thermal resistance per unit area of the partition member 1 were estimated.

Figure 14A:
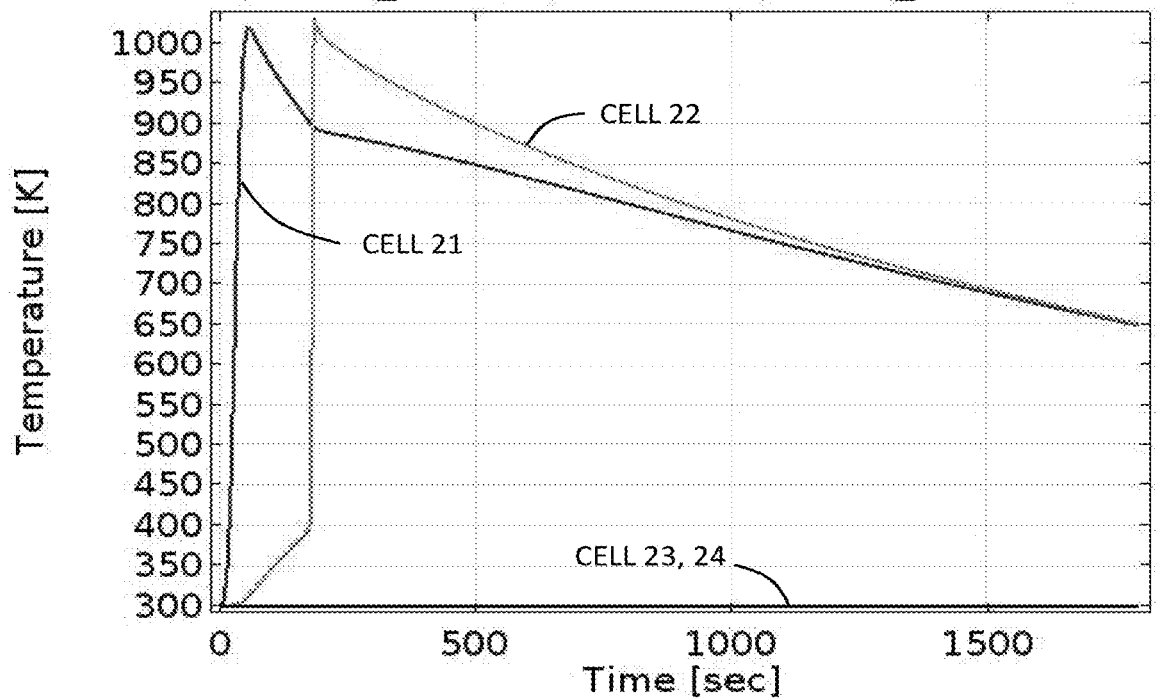
FIG. 14A is a graph showing a temperature variation inside a cell in comparative example 2-2.

FIG. 14A is a graph showing a temperature variation inside a cell in comparative example 2-2. An ordinate represents an absolute temperature [K] inside a cell 200 and an abscissa represents time [seconds] after the cell 21 reaches a state of abnormal heat generation. It is shown that, after the cell 21 reaches a state of abnormal heat generation, the temperature inside the cell 22 gradually rises and the cell 22 reaches a state of abnormal heat generation after approximately 200 seconds. Temperatures of the cell 23 and the cell 24 hardly rise. It was estimated that fire spread between the cells 2 cannot be suppressed under the conditions of comparative example 2-2.

Figure 14B:
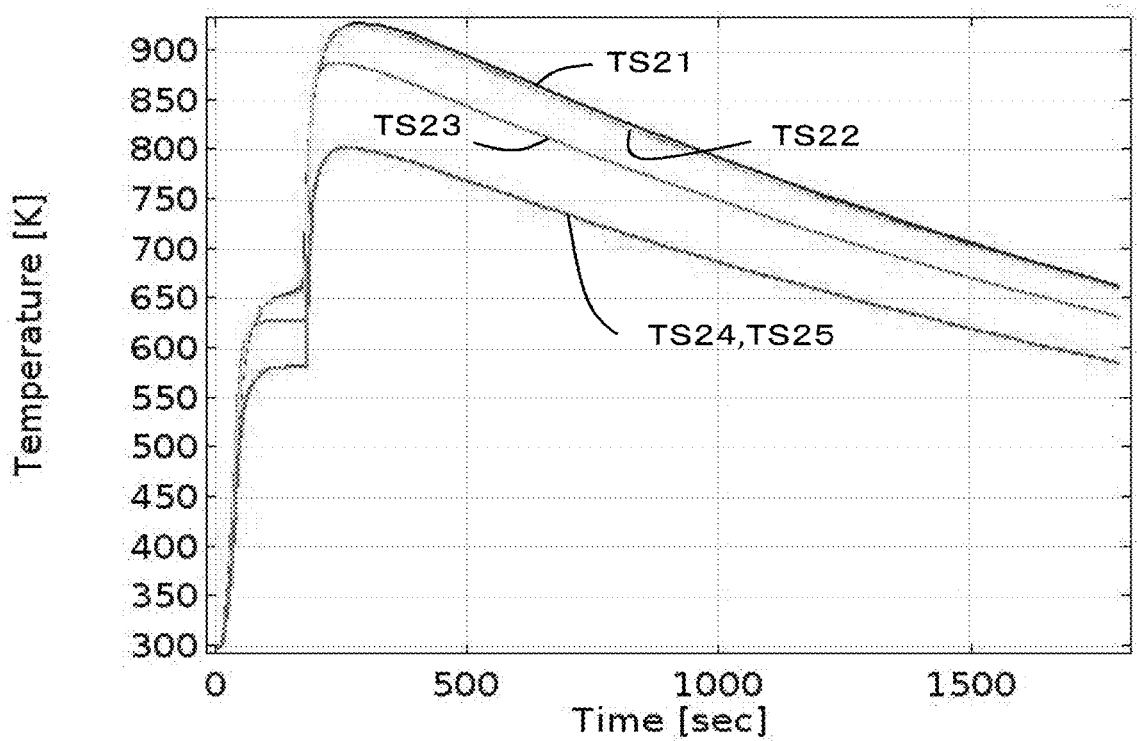
FIG. 14B is a graph showing a temperature transition inside a portion sandwiched between the cell 21 and the cell 22 among a partition member in comparative example 2-2.
Figure 14C:
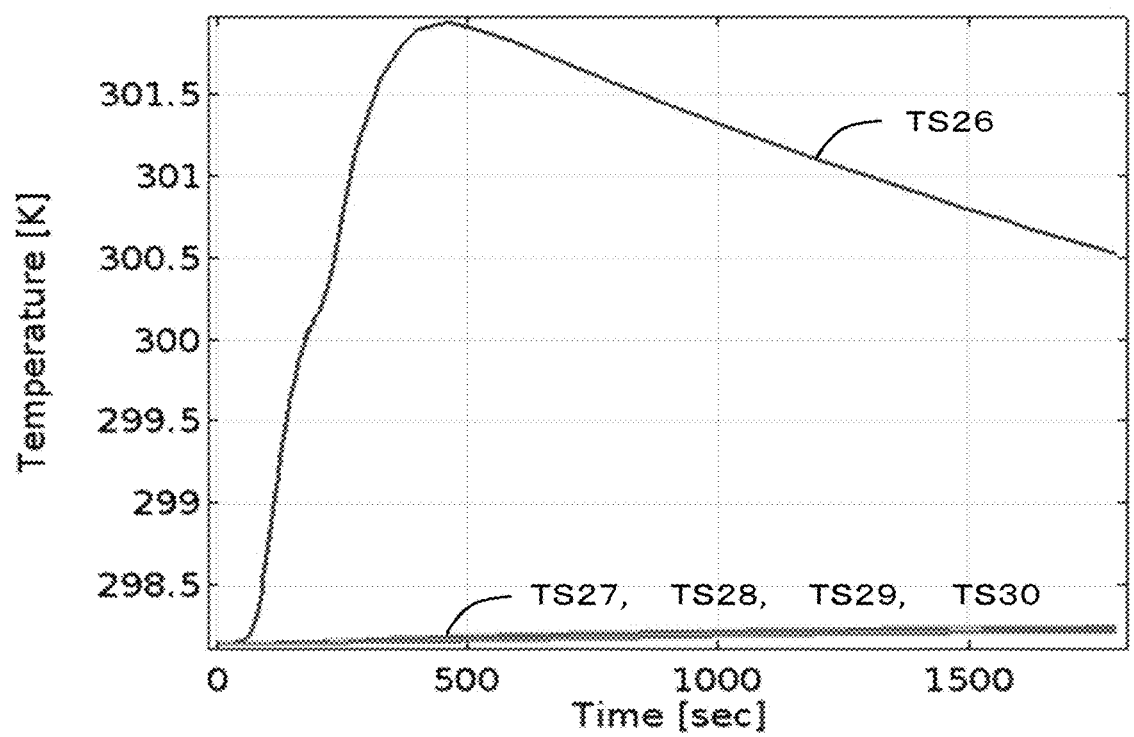
FIG. 14C is a graph showing a temperature transition inside a portion sandwiched between the cell 23 and the cell 24 among a partition member in comparative example 2-2.

FIG. 14B is a graph showing a temperature transition inside the portion sandwiched between the cell 21 and the cell 22 among the partition member in comparative example 2-2. The graph in FIG. 14B represents a transition in temperature at each of the temperature measurement points TS21 to TS25 inside the portion sandwiched between the cell 21 and the cell 22 among the partition member 1 shown in FIG. 8. FIG. 14C is a graph showing a temperature transition inside the portion sandwiched between the cell 23 and the cell 24 among the partition member in comparative example 2-2. The graph in FIG. 14C represents a transition in temperature at each of the temperature measurement points TS26 to TS30 inside the portion sandwiched between the cell 23 and the cell 24 among the partition member 1 shown in FIG. 8. In FIGS. 14B and 14C, ordinates represent a partition member internal temperature (K) and abscissas represent time [seconds] after the cell 21 reaches a state of abnormal heat generation.

Figure 14D:
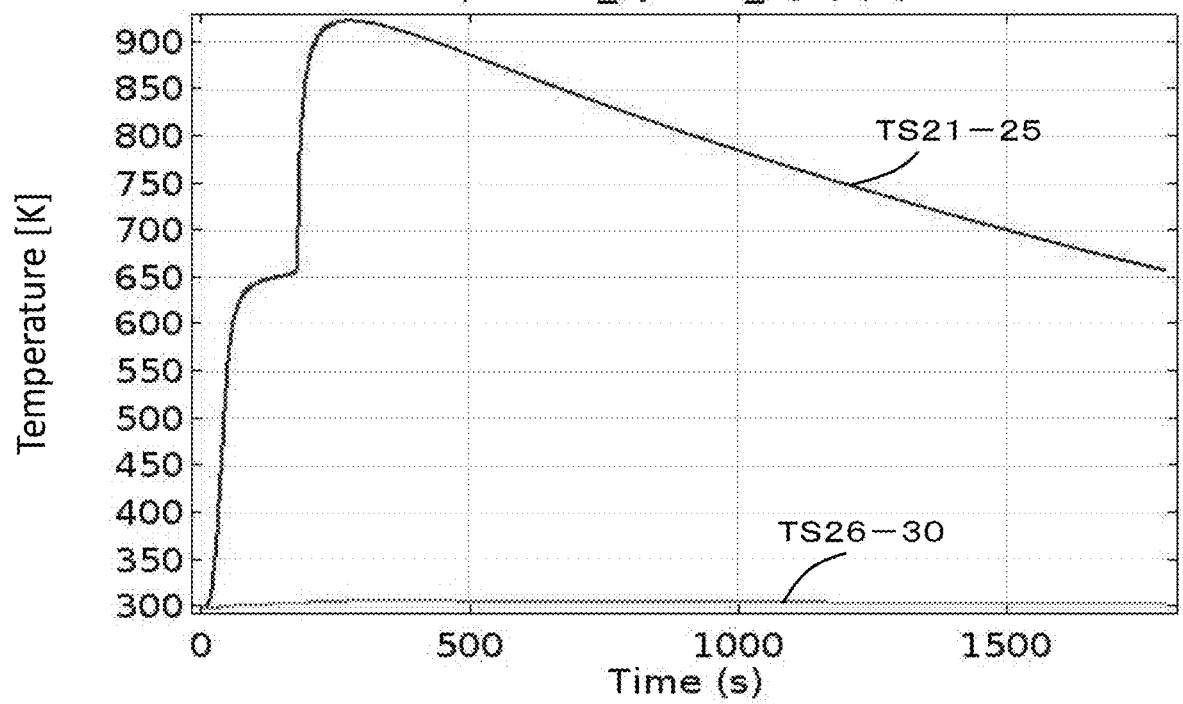
FIG. 14D is a graph showing transitions in an average temperature of an internal temperature of the partition member shown in FIG. 14B and an average temperature of an internal temperature of the partition member shown in FIG. 14C.

In addition, FIG. 14D is a graph showing a transition of average temperatures TS21 to TS25 of the portion sandwiched between the cell 21 and the cell 22 and a transition of average temperatures TS26 to TS30 of the portion sandwiched between the cell 23 and the cell 24 among the partition member 1 in comparative example 2-2. Each temperature is obtained from a weighted average of temperatures of respective points shown in FIG. 14B and FIG. 14C. An ordinate represents a partition member internal temperature (K) and an abscissa represents time [seconds] after the cell 21 reaches a state of abnormal heat generation. While the average temperature of the portion sandwiched between the cell 21 and the cell 22 inside the partition member starts to rise immediately after the cell 21 reaches a state of abnormal heat generation to around 650 K, at that time point, the average temperature of the portion sandwiched between the cell 23 and the cell 24 has hardly risen. In other words, it is shown that a degree of dispersion of heat transferred from the cell 21 at which abnormal heat generation had occurred to the cell 22, the cell 23, and the cell 24 inside the partition member 1 is not appropriate. Subsequently, while the average temperature of the portion sandwiched between the cell 21 and the cell 22 inside the partition member gradually drops, based on the fact that the cell 22 reaches a state of abnormal heat generation due to heat transferred from the cell 21 having reached a state of abnormal heat generation, it is expected that the average temperature of the portion sandwiched between the cell 21 and the cell 22 is to rise once again and reach around 900 K.

Table 2 shows setting values of physical properties of the partition member in comparative example 2-2 and shows values [m²·K/W] of thermal resistance per unit area in the thickness direction and values [m²·K/W] of thermal resistance per unit area in the plane direction as calculated from the setting values. A thermal resistance value ($\theta_{d2}=\theta_{d1}$) per unit area in the thickness direction was $1.0\times10^{-2}$ m²·K/W, and a thermal resistance initial value ($\theta_{p2}=\theta_{p1}$) per unit area in the plane direction was $3.7\times10^{-1}$ m²·K/W. It should be noted that a plane direction heat transfer distance used to calculate the thermal resistance values per unit area in the plane direction was set to $7.4\times10^{-2}$ m. From these values, it was calculated that $(\theta_{p1}/\theta_{p2})/(\theta_{d1}/\theta_{d2})=1.0$, and $\theta_{d1}/\theta_{p1}=2.7\times10^{-2}$.

In other words, the partition member 1 in comparative example 2-2 satisfies neither of the conditions related to thermal resistance per unit area of Expression 1 and Expression 2 described above.

According to the embodiments of a partition member, an assembled battery, and a heat transfer control method of an assembled battery, it enable to control heat transfer between unit batteries constituting an assembled battery or between a unit battery constituting an assembled battery and a member other than the unit battery.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A partition member which partitions between a pair of unit batteries or a partition member which partitions between a unit battery and a member other than the unit battery, comprising:
   a first surface; and
   a second surface opposite to the first surface,
   wherein $\theta_{d1}$, $\theta_{d2}$, $\theta_{p1}$, and $\theta_{p2}$ defined as follows satisfy:

$(\theta_{p1}/\theta_{p2})/(\theta_{d1}/\theta_{d2}) \leq 1.0\times10^{-4}$ $\theta_{d1}$: when a first point existing on the first surface of the partition member reaches 150° C., thermal resistance per unit area in a thickness direction defined by a difference in temperature between the first point and a second point at a plane-symmetrical position to the first point with respect to a division plane that bisects the partition member in the thickness direction on the second surface;
   $\theta_{p1}$: when the first point existing on the first surface of the partition member reaches 150° C., thermal resistance per unit area in a plane direction defined by a difference between a temperature at a first intersection point where a straight line connecting the first point and the second point and the division plane intersect each other and a temperature at a point on the division plane at a position at a distance that is ½ of a length of the partition member in a long axis direction from the first point in the long axis direction;
   $\theta_{d2}$: when the entire first surface is set to 40° C., thermal resistance per unit area in the thickness direction of the partition member which is defined by a difference in temperature between a third point at a same position as the first point and a fourth point at a same position as the second point; and
   $\theta_{p2}$: when the entire first surface is set to 40° C., thermal resistance per unit area in the plane direction of the partition member which is defined by a difference between a temperature at an intersection point where a straight line connecting the third point and the fourth point and the division plane intersect each other and a temperature at a point on the division plane at a position at a distance that is ½ of the length of the partition member in the long axis direction from the intersection point in the long axis direction, wherein the partition member comprises a packaging material including a fluid having a boiling point at ordinary pressure of 80° C. to 250° C., a fluid holding portion that includes a porous body and a flow path, and wherein the porous body includes a fibrous layer and a particle layer.

2. A partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries, the partition member having a long axis direction and a short axis direction respectively included in the plane direction and having a first surface and a second surface facing opposite directions in the thickness direction, the set of n-number of unit batteries being respectively in contact with the first surface and including a first unit battery and a third unit battery arranged apart from each other by a first distance, the set of m-number of unit batteries being in contact with the second surface and including a second unit battery which opposes the first unit battery across the partition member, wherein when an entire surface with which the first unit battery is in contact is set to 150° C., thermal resistance ($\theta_{d1}$) per unit area in the thickness direction of the partition member which is defined by a difference in temperature between a first point at the first distance in the long axis direction toward a side of the third unit battery from a center point of a surface on which the first unit battery comes into contact with the partition member and a second point at a plane-symmetrical position to the first point with respect to a division plane that bisects the partition member in the thickness direction on the second surface, thermal resistance ($\theta_{p1}$) per unit area in the plane direction of the partition member which is defined by a difference between a temperature at a first intersection point where a straight line connecting the first point and the second point and the division plane intersect each other and a temperature at a point at a second distance which is ½ of a length by which the partition member and the first unit battery are in contact with each other in the long axis direction and which is longer than the first distance in the plane direction of the partition member on the division plane from the first intersection point on the division plane, when the entire surface with which the first unit battery is in contact is set to 40° C., thermal resistance ($\theta_{d2}$) per unit area in the thickness direction of the partition member which is defined by a difference in temperature between a third point at a same position as the first point and a fourth point at a same position as the second point, thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane separated by the second distance in the plane direction of the partition member from the first intersection point on the division plane satisfy $(\theta_{p1}/\theta_{p2})/(\theta_{d1}/\theta_{d2}) \leq 1.0 \times 10^{-4}$, wherein the partition member comprises a packaging material including a fluid having a boiling point at ordinary pressure of 80° C. to 250° C., a fluid holding portion that includes a porous body and a flow path, and wherein the porous body includes a fibrous layer and a particle layer.

3. The partition member according to claim 1, wherein the thermal resistance ($\theta_{d1}$) and the thermal resistance ($\theta_{p1}$) satisfy $\theta_{d1}/\theta_{p1} \geq 1.0 \times 10^{2}$.

4. The partition member according to claim 1, wherein when a thickness of the unit battery in contact with the partition member is L [mm], the thickness of the partition member is L/50 mm or more and L/5 mm or less.

5. An assembled battery including the partition member according to claim 1.

6. The assembled battery according to claim 5, wherein a heat amount that is transferred from a unit battery in which an abnormal temperature rise had occurred to a unit battery opposing, in the thickness direction of the partition member, the unit battery in which an abnormal temperature rise had occurred is controlled by increasing the thermal resistance ($\theta_{d1}$) per unit area in the thickness direction of the partition member and reducing the thermal resistance ($\theta_{p1}$) per unit area in the plane direction.

7. A heat transfer control method of an assembled battery, the assembled battery including a partition member which partitions between a pair of unit batteries or a partition member which partitions between a unit battery and a member other than the unit battery, the partition member having a thickness direction and a plane direction perpendicular to the thickness direction, having a long axis direction and a short axis direction respectively included in the plane direction, and having a first surface and a second surface facing opposite directions in the thickness direction, the heat transfer control method comprising:

controlling a heat amount transferred via the partition member from the first unit battery by satisfying $(\theta_{p1}/\theta_{p2})/(\theta_{d1}/\theta_{d2}) \leq 1.0 \times 10^{-4}$:

when a first point on the first surface of the partition member reaches 150° C., thermal resistance ($\theta_{d1}$) per unit area in the thickness direction of the partition member which is defined by a difference in temperature between the first point and a second point at a plane-symmetrical position to the first point with respect to a division plane that bisects the partition member in the thickness direction on the second surface;

thermal resistance ($\theta_{p1}$) per unit area in the plane direction of the partition member which is defined by a difference between a temperature at a first intersection point where a straight line connecting the first point and the second point and the division plane intersect each other and a temperature at a point on the division plane at a position at a distance that is ½ of a length of the partition member in the long axis direction from the first intersection point in the long axis direction;

when the entire first surface is set to 40° C., thermal resistance ($\theta_{d2}$) per unit area in the thickness direction of the partition member which is defined by a difference in temperature between a third point at a same position as the first point and a fourth point at a same position as the second point; and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane at a position at a distance that is ½ of the length of the partition member in the long axis direction from the second intersection point in the long axis direction, wherein the partition member comprises a packaging material including a fluid having a boiling point at ordinary pressure of 80° C. to 250° C., a fluid holding portion that includes is a porous body and a flow path, and wherein the porous body includes a fibrous layer and a particle layer.

8. A heat transfer control method of an assembled battery, the assembled battery including a partition member which has a thickness direction and a plane direction perpendicular to the thickness direction and which partitions any of a set of n-number (where n is a positive integer) of unit batteries arranged in the plane direction, a set of m-number (where m is a positive integer) of unit batteries which differs from the set of n-number of unit batteries arranged in the plane direction, members other than unit batteries, and a combination of the m-number of unit batteries and the members other than unit batteries, the partition member having a long axis direction and a short axis direction respectively included in the plane direction and having a first surface and a second surface facing opposite directions in the thickness direction, the set of n-number of unit batteries being respectively in contact with the first surface and including a first unit battery and a third unit battery arranged apart from each other by a first distance, the set of m-number of unit batteries being in contact with the second surface and including a second unit battery which opposes the first unit battery across the partition member, the heat transfer control method comprising:

controlling a heat amount transferred via the partition member from the first unit battery by satisfying $(\theta_{p1}/\theta_{p2})/(\theta_{d1}/\theta_{d2}) \leq 1.0 \times 10^{-4}$:

when an entire surface with which the first unit battery is in contact is set to 150° C., thermal resistance ($\theta_{d1}$) per unit area in the thickness direction of the partition member which is defined by a difference in temperature between a first point at the first distance in the long axis direction toward a side of the third unit battery from a center point of a surface on which the first unit battery comes into contact with the partition member and a second point at a plane-symmetrical position to the first point with respect to a division plane that bisects the partition member in the thickness direction on the second surface;

thermal resistance ($\theta_{p1}$) per unit area in the plane direction of the partition member which is defined by a difference between a temperature at a first intersection point where a straight line connecting the first point and the second point and the division plane intersect each other and a temperature at a point at a second distance which is ½ of a length by which the partition member and the first unit battery are in contact with each other in the long axis direction and which is longer than the first distance in the plane direction of the partition member on the division plane from the first intersection point on the division plane;

when the entire surface with which the first unit battery is in contact is set to 40° C., thermal resistance ($\theta_{d2}$) per unit area in the thickness direction of the partition member which is defined by a difference in temperature between a third point at a same position as the first point and a fourth point at a same position as the second point; and thermal resistance ($\theta_{p2}$) per unit area in the plane direction of the partition member which is defined by a difference between a temperature at a second intersection point where a straight line connecting the third point and the fourth point and the division plane intersect each other and a temperature at a point on the division plane separated by the second distance in the plane direction of the partition member from the first intersection point on the division plane, wherein the partition member comprises a packaging material including a fluid having a boiling point at ordinary pressure of 80° C. to 250° C., a fluid holding portion that includes a porous body and a flow path, and wherein the porous body includes a fibrous layer and a particle layer.

9. The partition member according to claim 1, wherein the flow path has a meandering shape.

10. The partition member according to claim 1, wherein the flow path extends in a height direction and a width direction.

11. The partition member according to claim 10, wherein the width direction is perpendicular to the height direction.

12. The partition member according to claim 10, wherein a total length of the flow path is longer than a sum of the height direction and the width direction of the partition member.

* * * * *